(12) United States Patent
Matsuyama et al.

(10) Patent No.: US 7,919,544 B2
(45) Date of Patent: Apr. 5, 2011

(54) INK-MEDIA SET, INK COMPOSITION, INK CARTRIDGE, INKJET RECORDING METHOD, INKJET RECORDING APPARATUS, AND INK RECORDED MATTER

(75) Inventors: Akihiko Matsuyama, Isehara (JP); Tamotsu Aruga, Mishima (JP); Naoya Morohoshi, Numazu (JP); Tohru Ohshima, Atsugi (JP); Hiroshi Goto, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 12/280,630

(22) PCT Filed: Dec. 26, 2007

(86) PCT No.: PCT/JP2007/075394
§ 371 (c)(1),
(2), (4) Date: Aug. 25, 2008

(87) PCT Pub. No.: WO2008/078841
PCT Pub. Date: Jul. 3, 2008

(65) Prior Publication Data
US 2009/0043028 A1 Feb. 12, 2009

(30) Foreign Application Priority Data

Dec. 27, 2006 (JP) .................. 2006-353228
Mar. 19, 2007 (JP) .................. 2007-071531

(51) Int. Cl.
*C09D 11/10* (2006.01)

(52) U.S. Cl. ....... 523/160; 347/100; 347/106; 428/32.1; 106/31.28; 106/31.57; 106/31.9

(58) Field of Classification Search .................. 523/160; 347/100, 106; 428/32.1; 106/31.28, 31.57, 106/31.9
See application file for complete search history.

(56) References Cited

U.S. PATENT DOCUMENTS

| 4,352,691 A | 10/1982 | Owatari et al. |
| 5,854,307 A * | 12/1998 | Kimura et al. ................ 523/161 |
| 2007/0106962 A1* | 5/2007 | Sakakibara et al. .............. 716/1 |

FOREIGN PATENT DOCUMENTS

| JP | 60 34992 | 8/1985 |
| JP | 63 2996 | 1/1988 |
| JP | 2 18710 | 1/1990 |
| JP | 7 196966 | 8/1995 |

(Continued)

*Primary Examiner* — David Wu
*Assistant Examiner* — Vu A Nguyen
(74) *Attorney, Agent, or Firm* — Oblon, Spivak, McClelland, Maier & Neustadt, L.L.P.

(57) ABSTRACT

An ink-media set, comprising an ink composition and a recording medium, wherein the ink composition comprises a polymer fine particle containing a dye and an inorganic pigment particle, a water-soluble solvent, and water, and has a surface tension of 20 mN/m to 35 mN/m at 25° C., and the recording medium comprises a support and a coating layer on at least one side of the support, and the amount of pure water transferred to the recording medium is no less than 2 ml/m2 and less than 35 ml/m2 at a contact period of 100 ms and the amount of pure water transferred to the recording medium is no less than 3 ml/m2 and less than 40 ml/m2 at a contact period of 400 ms by measurement of a dynamic scanning absorptometer.

9 Claims, 4 Drawing Sheets

FOREIGN PATENT DOCUMENTS

| | | |
|---|---|---|
| JP | 7 268260 | 10/1995 |
| JP | 10 251567 | 9/1998 |
| JP | 2977817 | 9/1999 |
| JP | 2003 72059 | 3/2003 |
| JP | 2005 306899 | 11/2005 |
| JP | 3817813 | 6/2006 |
| JP | 3821306 | 6/2006 |
| JP | 2006 206666 | 8/2006 |
| JP | 3839894 | 8/2006 |
| JP | 2006 307165 | 11/2006 |

* cited by examiner

INK-MEDIA SET, INK COMPOSITION, INK CARTRIDGE, INKJET RECORDING METHOD, INKJET RECORDING APPARATUS, AND INK RECORDED MATTER

TECHNICAL FIELD

The present invention relates to an ink-media set and an ink composition that can provide high quality images with higher color saturation and adequate color tone even on recording media with low ink absorbability, and also an inkjet recording method, an inkjet recording apparatus, and an ink recorded matter that utilize the ink-media set.

BACKGROUND ART

Inkjet printers have been certainly become popular by virtue of low ambient noise and low running cost, and color printers capable of printing on regular paper have been remarkably spreading into markets. However, it is very difficult to satisfy all necessary properties including color reproducibility of images, wear resistance, light resistance, gas resistance, water resistance, drying property of images, character spreading (feathering), spreading at color boundary (color bleed), concentration nonuniformity at solid portion (beading), printing ability on both sides, and ejection stability, thus an ink composition and a recording medium are selected depending on prior properties of individual applications.

Ink compositions, for inkjet recording, are typically based on water to which a colorant and a humectant such as glycerin for preventing clogging are incorporated. The colorant is mainly water soluble dyes capable of clearly coloring.

However, dyes suffer from poor quality non-allowable on regular paper due to inferior light resistance, gas resistance, and water resistance. In order to address this problem, inkjet-exclusive recording paper having an ink absorbing layer has been used and challenged to improve theses resistances, but there still is a problem that the quality is insufficient.

Pigments have been hence employed in recent years from the viewpoint that pigments can provide excellent light resistance, gas resistance, and water resistance. However, the pigments suffer from inferior coloring property compared to dyes. The reason is believed that lights with different wavelengths and phases interfere in the pigments due to optical multiple reflections.

Therefore, there arise such problems as decrease of color saturation in regular paper and decrease of gloss level in inkjet recording paper when the pigments are employed for a colorant of an ink composition for inkjet recording. In order to address these problems, the color saturation is tried to increase by way of making finer the pigment particles or the gloss level is tried to increase by way of coating a polymer on pigment particles; however, there still exists a difference from the dyes in terms of coloring property.

In addition, highly water-absorbable paper such as the regular paper and the inkjet-exclusive recording paper is employed as the recording media for inkjet recording; such paper typically exhibits an amount of pure water transferred to the recording media of above 35 ml/m$^2$ at a contact period of 100 ms and above 40 ml/m$^2$ at a contact period of 400 ms by measurement of a dynamic scanning absorptometer.

The regular paper having such high water absorbability is advantageous because of being thin and inexpensive, however, suffers from images with poor coloring property and gloom impression since coloring ingredients of ink compositions easily infiltrate into the paper and thus the amount of coloring ingredients on the surface comes to small. The absorbability of the inkjet-exclusive recording paper can be afforded by way of providing a layer of inorganic pigment or water-absorbable polymer on the surface, thus coloring ingredients can remain around the surface and highly coloring property can be induced; however, the inkjet-exclusive recording paper suffers from larger thickness and higher cost beyond comparison with that of the regular paper.

Furthermore, polymer films with no receiving layer on their surface may be exemplified as the recording media. The polymer films typically exhibit an amount of pure water transferred to the recording media of below 2 ml/m$^2$ at a contact period of 100 ms and below 3 ml/m$^2$ at a contact period of 400 ms by measurement of the dynamic scanning absorptometer.

The polymer films as the recording media can scarcely absorb water, thus there often arise such problems as offset smear and ink-void due to spurs (hereinafter sometimes referred to as "spur stain"), beading, and backside smear while stacking, thus the polymer films are far from practical use.

Furthermore, surface-coated paper may be exemplified as the recording media. The surface-coated paper typically exhibits an amount of pure water transferred to the recording media of 2 to 35 ml/m$^2$ at a contact period of 100 ms and 3 to 40 ml/m$^2$ at a contact period of 400 ms by measurement of the dynamic scanning absorptometer. The surface-coated paper as the recording media, which being mainly used for such applications as offset printing and gravure printing, has a less thickness and is not so different with regular paper in terms of price. When images are formed on the recording media using aqueous inkjet inks of which colorant is a pigment, high quality images can be obtained with excellent coloring property and high glossiness since the colorant remains on the surface. However, when the colorant is an aqueous dye, there arises such a problem that the resulting color is of low density and dull since the colorant migrates into substrates (cellulose) through pores of coating layers at the surface together with moisture and aqueous solvent without remaining on the surface.

Furthermore, when pigment inks are employed, highly coloring images can be obtained, however, there arise such problems as spur stain, beading, and backside smear while stacking because of slow drying of ink compositions.

A number of processes are proposed in order to solve the drying of the ink compositions. For example, a process to use a strong alkaline ink is proposed (see Patent Literature 1). However, this proposal suffers from such problems as dangerous handling, tendency to decrease significantly fixability of acid-free paper, easy show through, and remarkable difficulty to record both sides.

A recording process is also proposed to use an oil-based ink composition containing a water-insoluble organic solvent as a liquid medium. However, this proposal is limited to industrial applications in spite of excellent fixability since countermeasures for odor and safety as regards the organic solvent are essential, thus is far from the situation to be employed in offices and general homes.

A process to use an ink composition is proposed in which the ink composition contains a large amount of a surfactant or a surfactant with a lower surface tension (see Patent Literature 2). The ink composition of this proposal may exhibit an excellent drying velocity after printing compared to those of conventional ink compositions, however, hands may be stained upon taking promptly by hand the matters printed at recording apparatuses depending on the species of papers, or significant feathering may occur depending on the species of papers.

A recording process is also proposed in which an ink composition, which being a wax-like solid at normal temperature, is heated and ejected to record under a molten condition (see Patent Literature 3). However, this proposal leads to convex portions of printed characters, which arises such problems as the printed characters transfer and/or papers stick together when a number of the printed matters are stacked and left to stand. In addition, a heating unit is necessary to heat the ink composition, which making the apparatus complicated.

A process to promote the drying is also proposed in which recording paper is heated after printing characters (see Patent Literature 4). However, this proposal suffers from larger electricity consumption since heating rollers and warm-air blowers are necessary, which making difficult to be used in offices or general homes.

As described above, colorants on the basis of dyes exhibit excellent coloring property compared to colorants on the basis of pigments, but represent non-allowable quality when combined with regular paper because the light resistance, gas resistance, and water resistance are inferior as described above.

In order to address the light resistance, gas resistance, and water resistance, processes to use a colorant are proposed in which a dye is dissolved or included into a polymer fine particle to form a colorant (see Patent Literatures 5 to 8). The dye is essentially water-insoluble in these proposals, and the water resistance and the gas resistance are equivalent with those of pigments along with maintaining the highly coloring property of dyes. However, these proposals are limited to recording on regular paper or inkjet-exclusive recording paper, and there arise such problems as occurrences of beading and insufficient drying property when being recorded on recording media with a lower absorbability, specifically, on those of which the amount of pure water transferred to the recording media is below 4 ml/m$^2$ at a contact period of 100 ms and below 5 ml/m$^2$ at a contact period of 400 ms.

In order to solve the problem of drying property in cases where colorants on the basis of dyes are applied to recording media with a lower absorbability, a process is also proposed in which the dye is included into polymer emulsion and the viscosity of an aqueous ink composition is raised (see Patent Literature 9). This proposal may be effective for recording paper with higher absorbability since higher viscosity leads to higher solid content of ink compositions as well as more prompt drying, but is insufficient for recording media with lower absorbability.

Accordingly, the development of an ink-media set is currently demanded that can provide high quality images with higher color saturation and adequate color tone not only on regular paper and inkjet-exclusive recording paper but also on recording media with low ink absorbability.

The recording media for inkjet recording exhibit higher ink absorbability similarly as the regular paper and inkjet-exclusive recording paper, and correspond to those of which the amount of pure water transferred to the recording media is in general above 15 ml/m$^2$ at a contact period of 100 ms and above 20 ml/m$^2$ at a contact period of 400 ms by measurement of the dynamic scanning absorptometer. The regular paper with such adequate absorbability is advantageously thin and inexpensive, however, there arise such problems as show through occurs since color ingredients of inks tend to infiltrate into paper and the coloring property is poor and the images induce gloom impression since the amount of coloring ingredients on the surface comes to small. On the other hand, the exclusive recording paper is provided with the absorbability by way of placing a layer of inorganic pigment or water-absorbable polymer on the surface, thus coloring ingredients can remain around the surface and highly coloring property can be induced; however, the inkjet-exclusive recording paper suffers from larger thickness and higher cost beyond comparison with that of the regular paper.

On the contrary, as regards the recording media that exhibit little ink absorbability such that the amount of ink composition transferred to the recording media is below 4 ml/m$^2$ at a contact period of 100 ms and below 7 ml/m$^2$ at a contact period of 400 ms by measurement of the dynamic scanning absorptometer, polymer films with no receiving layer on their surface may be exemplified as such recording media. The polymer films as the recording media can scarcely absorb inks, thus there often arise such problems as offset smear and ink-void due to spurs, beading, and backside smear while stacking, thus the polymer films are far from practical use.

As regards the recording media having an intermediate ink absorbability among the recording media described above such that the amount of ink composition transferred to the recording media is 4 to 15 ml/m$^2$ at a contact period of 100 ms and 7 to 20 ml/m$^2$ at a contact period of 400 ms by measurement of the dynamic scanning absorptometer, surface-coated paper is exemplified that is mainly used for such applications as offset printing and gravure printing. These recording media are thin and the price is not so different from that of regular paper. There arise in these recording media such problems as occurrences of spur stain, beading, and backside smear while stacking since the drying of inks is slow in these recording media.

When images are formed on these recording media using aqueous inkjet inks, there arise such problems as heavy bleeding and show through, lower density, and gloom coloring, since the colorant under a dissolved condition like water-soluble dyes migrates into substrates (cellulose) through pores of coating layers at the surface together with moisture and aqueous solvent without remaining on the surface.

When the colorant represents a dispersed condition like pigments, the coloring property may be excellent compared to those of water-soluble dyes since the colorant remains on the surface; however, the poor coloring property cannot be improved inherently to pigments, resulting in images with unsatisfactory coloring property.

On the other hand, when water-insoluble dyes such as oil-soluble dyes and disperse dyes are used in a dispersed condition, clear coloring can often be obtained since the colorant can remain at the surface, thus the water-insoluble dyes are considered to be most adequate for recording media with lower absorbability. However, the water-insoluble dye may dissolve into an organic solvent in inks thus the water-insoluble dye partially dissolves into an ink vehicle, and the dye under a dissolved condition causes coloring of clear color inherent to the dye. Therefore, there arise such problems as occurrences of bleeding and show through, low density, and gloom coloring similarly as water-soluble dyes when the dissolved content of dyes is excessive.

As regards the process to solve the problems in terms of the drying property described above, a recording process is proposed to use an oil-based ink composition containing a water-insoluble organic solvent as a liquid medium; however, this proposal is limited to industrial applications in spite of excellent fixability since countermeasures for odor and safety as regards the organic solvent are essential, thus is far from the situation to be employed in offices and general homes.

In order to improve the light resistance, gas resistance, and water resistance of dyes, Patent Literatures 5 to 8 propose colorants in which a dye is dissolved or included into a polymer fine particle. Patent Literature 10 proposes to further add an inorganic pigment. These proposals make possible to take the water resistance and the gas resistance equivalent with those of pigments, however, their applications are limited to recording on the regular paper and the inkjet-exclusive recording paper, and do not address the problems such as beading and drying property where recording is carried out on recording media with lower absorbability like the present invention.

Patent Literature 11 proposes that a pigment ink or a fine particle ink of colored polymer, where a dye being covered by a polymer, is printed on recording media with lower absorbability such as art paper and printing paper like those of the present invention. However, the invention concerns to an ink where the colorant is substantially insoluble into ink vehicle and dispersed in a particulate condition, and does not refers that the coloring property can be enhanced by way of dissolving partially the colorant like the present invention.

Patent Literature 1: Japanese Patent Application Publication (JP-B) No. 63-2996
    Patent Literature 2: JP-B No. 60-34992
    Patent Literature 3: JP-A No. 02-18710
    Patent Literature 4: JP-A No. 2003-72059
    Patent Literature 5: Japanese Patent (JP-B) No. 3821306
    Patent Literature 6: JP-B No. 3817813
    Patent Literature 7: JP-B No. 3839894
    Patent Literature 8: JP-B No. 2977817
    Patent Literature 9: JP-A No. 2005-306899
    Patent Literature 10: JP-A No. 2006-307165
    Patent Literature 11: JP-A No. 2006-206666

DISCLOSURE OF INVENTION

The present invention has been made in view of the situation in the art, and aims to solve the problems described above and to attain the objects as follows. That is, the present invention aims to provide an ink-media set and an ink composition that can form high quality images with higher color saturation and adequate color tone even on recording media with low ink absorbability not only on regular paper or inkjet-exclusive recording paper, and also to provide an inkjet recording method, an inkjet recording apparatus, and an ink recorded matter that utilize the ink-media set.

The present inventors have investigated vigorously to solve the problems described above and found the following findings. That is, the findings are such that a combination of a certain ink composition and a certain recording medium can lead to high quality images with higher color saturation and adequate color tone even on recording media with low ink absorbability not only on regular paper or inkjet-exclusive recording paper.

The present invention is based on the findings by the present inventors and the problems described above can be solved by the present invention as follows:

<1> An ink-media set, comprising an ink composition and a recording medium,
    wherein the ink composition comprises a polymer fine particle containing a dye and an inorganic pigment particle, a water-soluble solvent, and water, and has a surface tension of 20 mN/m to 35 mN/m at 25° C., and
    the recording medium comprises a support and a coating layer on at least one side of the support, and the amount of pure water transferred to the recording medium is no less than 2 ml/m$^2$ and less than 35 ml/m$^2$ at a contact period of 100 ms and the amount of pure water transferred to the recording medium is no less than 3 ml/m$^2$ and less than 40 ml/m$^2$ at a contact period of 400 ms by measurement of a dynamic scanning absorptometer.

<2> The ink-media set according to <1>, wherein the viscosity of the ink composition is 5 mPa·s to 50 mPa·s at 25° C.
<3> The ink-media set according to <1> or <2>, wherein the dye is at least one of oil-soluble dyes and disperse dyes.
<4> The ink-media set according to any one of <1> to <3>, wherein the inorganic pigment particle is one of titanium dioxide particles, alumina particles, and silica particles.
<5> The ink-media set according to any one of <1> to <4>, wherein the polymer of the polymer fine particle containing the dye and the inorganic pigment fine particle is at least one of polyester resins, polyurethane resins, vinyl resins, and acrylic resins.
<6> The ink-media set according to any one of <1> to <5>, wherein the volume average particle diameter of the polymer fine particle containing the dye and the inorganic pigment fine particle is 5 nm to 200 nm.
<7> The ink-media set according to any one of <1> to <6>, wherein the water-soluble solvent is at least one of glycerin, diethylene glycol, triethylene glycol, 1,3-butanediol, 1,6-hexanediol, propylene glycol, 1,5-pentanediol, dipropylene glycol, trimethylolpropane, and 3-methyl-1,3-butanediol.
<8> The ink-media set according to any one of <1> to <7>, wherein the ink-media set comprises at least one of polyol compounds having 8 or more carbon atoms and glycol ether compounds.
<9> An ink-media set, comprising:
    an ink composition, and
    a recording medium on which the ink composition is deposited to make printing,
    wherein the ink composition comprises an organic solvent, water, and a colorant, and the colorant is substantially insoluble in water and soluble in the organic solvent,
    the colorant exists in a dispersed condition and a dissolved condition in water and the organic solvent, and the amount of the colorant in the dissolved condition after separating by way of ultrafiltration, of which molecular mass cut off being 50,000, is no more than 10% based on total amount of the colorant in the ink composition, and
    the recording medium comprises a support and a coating layer on at least one side of the support, and the amount of the ink composition transferred to the recording medium is 4 ml/m$^2$ to 15 ml/m$^2$ at a contact period of 100 ms and the amount of the ink composition transferred to the recording medium is 7 ml/m$^2$ to 20 ml/m$^2$ at a contact period of 400 ms by measurement of a dynamic scanning absorptometer.
<10> An ink composition, comprising an organic solvent, water, and a colorant,
    wherein the colorant is substantially insoluble in water and soluble in the organic solvent,
    the colorant exists in a dispersed condition and a dissolved condition in water and the organic solvent, and the amount of the colorant in the dissolved condition after separating by way of ultrafiltration, of which molecular mass cut off being 50,000, is no more than 10% based on total amount of the colorant in the ink composition, and
    the ink composition is used for the ink-media set according to any one of <1> to <9>.
<11> An ink cartridge, comprising the ink composition of the ink-media set according to any one of <1> to <9> in a container.
<12> An inkjet recording method, comprising at least an ink ejecting step, wherein the ink composition of the ink-media set according to any one of <1> to <9> is, in the ink ejecting step, applied a stimulus to record an image on the recording medium of the ink-media set through ejecting the ink composition.

<13>. The inkjet recording method according to <12>, wherein the stimulus is at least one selected from heat, pressure, vibration, and light.

<14> An inkjet recording apparatus, comprising at least an ink ejecting unit, wherein the ink composition of the ink-media set according to any one of <1> to <9> is, by the ink ejecting unit, applied a stimulus to record an image on the recording medium of the ink-media set through ejecting the ink composition.

<15> The inkjet recording apparatus according to <14>, wherein the stimulus is at least one selected from heat, pressure, vibration, and light.

<16> An ink recorded matter, comprising an image formed on the recording medium of the ink-media set according to any one of <1> to <9> by use of the ink composition of the ink-media set.

The ink-media set according to the present invention comprises an ink composition and a recording medium, in which the ink composition comprises a polymer fine particle containing a dye and an inorganic pigment particle, a water-soluble solvent, and water, and has a surface tension of 20 mN/m to 35 mN/m at 25° C., and the recording medium comprises a support and a coating layer on at least one side of the support, and the amount of pure water transferred to the recording medium is no less than 2 ml/m$^2$ and less than 35 ml/m$^2$ at a contact period of 100 ms and the amount of pure water transferred to the recording medium is no less than 3 ml/m$^2$ and less than 40 ml/m$^2$ at a contact period of 400 ms by measurement of the dynamic scanning absorptometer.

The ink-media set according to the present invention can provide high quality images with higher color saturation and adequate color tone. That is, the dye is employed, thereby clear images can be obtained on regular paper or exclusive recording paper with higher coloring property compared to pigments; the inorganic pigment particle is employed, thereby clear images can be obtained with still higher coloring property; the dye and the inorganic pigment particle are incorporated into the polymer, thereby the ink-media set is provided that allows higher gas resistance and also can form images with higher coloring property compared to that of pigment inks without depressing images like aqueous dye inks, when images are formed on recording media with low ink absorbability such that and the amount of pure water transferred to the recording medium is no less than 2 ml/m$^2$ and less than 35 ml/m$^2$ at a contact period of 100 ms and the amount of pure water transferred to the recording medium is no less than 3 ml/m$^2$ and less than 40 ml/m$^2$ at a contact period of 400 ms.

Furthermore, as regards the problems that dying is slow for the recording media with low ink absorbability and the setting of colorants is time-consuming, it is possible to provide an ink-media set that can form images with high fineness and high quality while suppressing the beading by way of controlling the surface tension of the ink composition to 20 to 35 mN/m at 25° C.

By virtue of the ink-media set that comprises an ink composition, and a recording medium on which the ink composition is deposited to make printing, wherein the ink composition comprises an organic solvent, water, and a colorant, and the colorant is substantially insoluble in water and soluble in the organic solvent, the colorant exists in a dispersed condition and a dissolved condition in water and the organic solvent, and the amount of the colorant in the dissolved condition after separating by way of ultrafiltration, of which molecular mass cut off being 50,000, is no more than 10% based on total amount of the colorant in the ink composition, and the recording medium comprises a support and a coating layer on at least one side of the support, and the amount of the ink composition transferred to the recording medium is 4 ml/m$^2$ to 15 ml/m$^2$ at a contact period of 100 ms and the amount of the ink composition transferred to the recording medium is 7 ml/m$^2$ to 20 ml/m$^2$ at a contact period of 400 ms by measurement of a dynamic scanning absorptometer in combination with the ink composition tailored thereto, high quality images with higher color saturation and adequate color tone can be formed on supports or media without spreading or show through.

The inkjet recording method according to the present invention comprises at least an ink ejecting step, in which the ink composition of the ink-media set according to the present invention is, in the ink ejecting step, applied a stimulus to record an image on the recording medium of the ink-media set through ejecting the ink composition.

The inkjet recording method according to the present invention can form high quality images with higher color saturation and adequate color tone by way of printing the ink composition of the ink-media set according to the present invention on the recording medium of the ink-media set.

The inkjet recording apparatus comprises at least an ink ejecting unit, in which the ink composition of the ink-media set according to the present invention is, by the ink ejecting unit, applied a stimulus to record an image through ejecting the ink composition.

The inkjet recording apparatus according to the present invention can form high quality images with higher color saturation and adequate color tone by means of printing the ink composition of the ink-media set according to the present invention on the recording medium of the ink-media set.

The ink recorded matter according to the present invention comprises an image formed on the recording medium of the ink-media set according to the present invention by use of the ink composition of the ink-media set.

The ink recorded matter according to the present invention may be of higher color saturation and adequate color tone by virtue of the ink-media set according to the present invention.

The present invention can solve the problems in the art and provide the ink-media set that can form high quality images with higher color saturation and adequate color tone even on recording media with low ink absorbability not only on regular paper or inkjet-exclusive recording paper, and also provide the inkjet recording method, the inkjet recording apparatus, and the ink recorded matter that utilize the ink-media set.

BEST MODE FOR CARRYING OUT THE INVENTION

Figure 1:
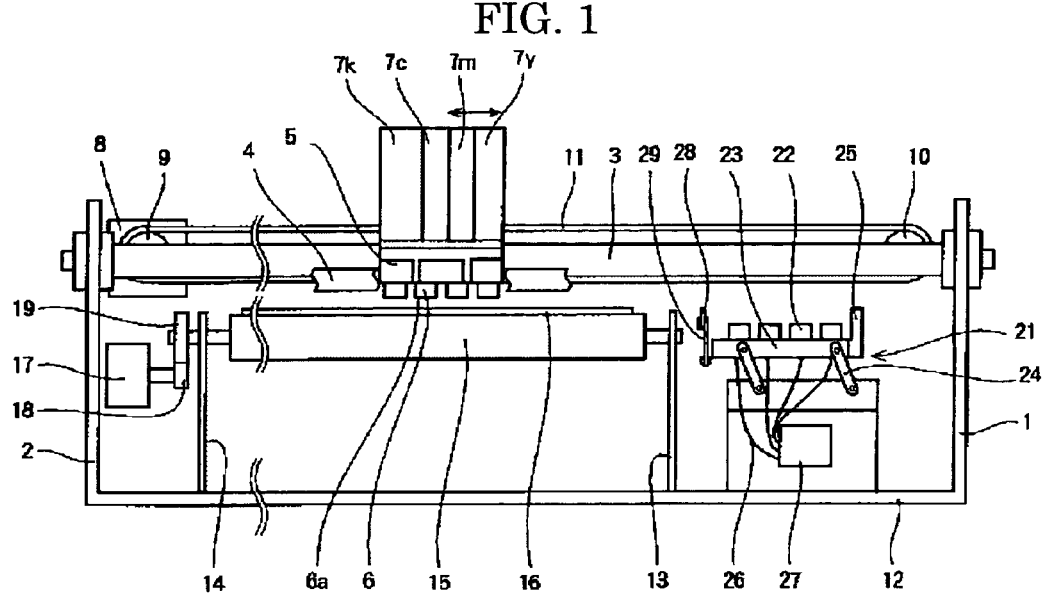
FIG. 1 is a schematic front view that exemplarily shows a construction of an inkjet recording apparatus of serial type that mounts an ink cartridge containing an inventive ink composition.

The present inventors have investigated vigorously to solve the problems described above and consequently the present invention has been made.

That is, the present invention relates to the ink composition, in which the ink composition comprises an organic solvent and a colorant, and the colorant is substantially insoluble in water and soluble in the organic solvent, the colorant exists in a dispersed condition and a dissolved condition in water and the organic solvent, and the amount of the colorant in the dissolved condition after separating by way of ultrafiltration, of which molecular mass cut off being 50,000, is no more than 10% based on total amount of the colorant in the ink composition; and it has been found that high quality images with higher color saturation and adequate color tone can be obtained without spreading or show through at supports (media) when the ink composition is applied to the recording medium that comprises a support and a coating layer on at least one side of the support, and the amount of the ink composition transferred to the recording medium is 4 ml/m² to 15 ml/m² at a contact period 100 ms and the amount of the ink composition transferred to the recording medium is 7 ml/m² to 20 ml/m² at a contact period of 400 ms by measurement of the dynamic scanning absorptometer.

When images are formed on a recording medium with low ink absorbability like the present invention, water-insoluble dyes such as oil-soluble dyes and disperse dyes may exhibit more excellent coloring property than water-soluble dyes and pigments. The water-insoluble dyes may represent a solubility to organic solvents in inks thus exhibit a partially dissolved condition. When the soluble content is no more than 10% based on the total amount of the colorant in the ink, more preferably 0.5% to 3%, the problems of spreading or show through may be prevented to occur and also high quality images with higher color saturation and adequate color tone can be obtained because of inherent clear coloring of the partially dissolved dyes.

In order to adjust the soluble amount of colorants, the selection of the organic solvent is important; examples of the organic solvent, suited to the present invention to prevent excessive elution, include glycerin, trimethylolpropane, glycol ether, triethylene glycol, propylene glycol, dipropylene glycol, 1,3-butanediol, 3-methyl-1,3-butanediol, 2-pyrrolidone, N-methyl-2-pyrrolidone, and polyols having 8 or more carbon atoms.

Furthermore, the water-insoluble dyes may lead to images with clear coloring property comparable with water-insoluble dyes even on regular paper and exclusive recording paper and water resistance may be improved to the level of pigments. In addition, the light resistance and the gas resistance may be enhanced by way of incorporating the dye into polymers or preparing a condition of dispersed particle with inorganic pigment particles.

That is, the ink composition, the ink-media set, the inkjet recording method, and the recorded matter can be provided that form images higher color saturation and adequate color tone compared to those of pigment inks without spreading, show through, or depressing images like aqueous dye inks, even when images are formed on recording media with low ink absorbability in such a condition that the amount of the ink composition transferred to the recording medium is 4 ml/m² to 15 ml/m² at a contact period of 100 ms and the amount of the ink composition transferred to the recording medium is 7 ml/m² to 20 ml/m² at a contact period of 400 ms.

In addition, as regards the problems that dying is slow for the recording media with low ink absorbability and the setting of colorants is time-consuming, it is possible to provide an ink-media set that can suppress the beading by way of controlling the surface tension of the ink composition to 20 to 35 mN/m. Furthermore, the viscosity adjusted in a range of 5 mPa·s to 50 mPa·s at 25° C. may allow the ink to be free from feathering or beading.

The term "beading" in the present invention refers to such a phenomenon of density nonuniformity that ink droplets, ejected onto a surface of a recording medium at inkjet recording, cannot be absorbed entirely into the recording medium till the subsequent ink droplets reach thereto to remain at the surface of the recording medium and mix with the subsequent droplets to make a part of colorant in the ink into blocks thereby to generate the density nonuniformity. There is a relation between the phenomenon and the amount of ink absorbed into the recording medium within a relatively short period of 100 ms at the latest of the contact period in the recent conventional printers; as regards green image portions, for example, the level of beading depends on the amount of Y (yellow) or C (cyan) ink absorbed or transferred to recording medium between from Y or C ink is ejected to C or Y ink is ejected.

The dispersed condition and the dissolved condition are distinguished, in the present invention, from the particle diameter using the boundary level of 5 nm. The border line will be reasonable by reason that the particle diameter of 5 nm approximately corresponds to the molecular mass of about 50,000 in organic materials, and colorants having a molecular mass higher than 50,000 are non-major. The method to distinguish the dispersed condition and the dissolved condition may be based on conventional filtering devices or centrifugal separators; most preferably, the ultrafiltration devices are used.

It is preferred in the present invention that the content of the colorant in a dissolved condition, which being separated by ultrafiltration with a molecular mass cut off of 50,000, is no more than 10% based on the total amount of the colorant, more preferably 0.5% to 3%.

When the content of the soluble colorant is more than 10% based on the entire colorant, image spreading (feathering) and/or back printing (show through) unfavorably occurs since the colorant dissolved in an ink vehicle migrates along with infiltration of the vehicle after printing on recording media. The occurrence of these problems depends on the combination with a recording medium and is pronounced when the amount of the ink composition transferred to the recording medium is 4 ml/m² to 15 ml/m² at a contact period of 100 ms and the amount of the ink composition transferred to the recording medium is 7 ml/m² to 20 ml/m² at a contact period of 400 ms by measurement of the dynamic scanning absorptometer. When the content of the soluble colorant is 3% to 10% based on the entire colorant, the back printing (show through) is unlikely to occur on the recording medium described above, but the image spreading (feathering) may occur in an allowable range. When the content of the soluble colorant is no more than 3% based on the entire colorant, no image spreading (feathering) nor back printing (show through) occurs even on the recording medium described above. Colorants may typically exhibit more excellent coloring property in dissolved condition, and sufficiently clear coloring can be obtained when 0.5% or more of colorant is dissolved even if most of the other is in a dispersed condition. As such, when the content of the soluble colorant is below 0.5% based on the entire colorant, it is undesirable in that the coloring tends to be gloom, although being within an allowable range, in the combination with the recording medium.

In order to make the content of the soluble colorant within the range described above, the solubility of the colorant can be adjusted by way of combining with a polymer. The content of the polymer may be appropriately increased or decreased, or the species of polymer may be properly selected in view of adequate adhesiveness with the dye. In addition, two or three organic solvents may be combined to adjust the solubility of the colorant from the view point of dissolving ability, moisture retainability, permeability, etc.

Ink-Media Set

The ink-media set according to the present invention comprises the ink composition, the recording medium, and the other optional ingredients.

The ink composition comprises a polymer fine particle containing a dye and an inorganic pigment particle, a water-soluble solvent, and water, and has a surface tension of 20 mN/m to 35 mN/m at 25° C.

The recording medium comprises a support and a coating layer on at least one side of the support, and the amount of pure water transferred to the recording medium is no less than 2 ml/m² and less than 35 ml/m² at a contact period of 100 ms and the amount of pure water transferred to the recording medium is no less than 3 ml/m² and less than 40 ml/m² at a contact period of 400 ms by measurement of the dynamic scanning absorptometer.

The ink-media set according to the present invention comprises the ink composition and the recording medium, consequently, high quality images with higher color saturation and adequate color tone can be obtained even on recording media with low ink absorbability not only on regular paper or inkjet-exclusive recording paper.

Ink Composition

The ink composition contains at least a polymer fine particle containing a dye and an inorganic pigment particle, a water-soluble solvent, and water, and also other optional ingredients such as wetting agent.

The ink composition has a surface tension of 20 to 35 mN/m at 25° C., preferably 24 to 30 mN/m. The surface tension in the range of 20 to 35 mN/m may suppress the occurrences of beading and lead to provide an ink-media set that can form images with high fineness and high quality.

The method to measure the surface tension may be properly selected from publicly known ones; for example, the surface tension may be measured by use of a surface tension meter (by Kyowa Interface Science Co., CBVP-Z) and a platinum plate at 25° C.

The viscosity of the ink composition is preferably 5 to 50 mPa·s at 25° C. When the viscosity is below 5 mPa·s, ink droplets tend to spread too wide on the recording medium, resulting possibly in occurrences of beading or color bleed, and when the viscosity is above 50 mPa·s, ink droplets come to small and some nozzles may eject no ink droplets, which possibly resulting in disordered images.

Polymer Fine Particle Containing Dye and Inorganic Pigment Particle

The polymer fine particle containing a dye and an inorganic pigment particle is one where the dye and the inorganic pigment particle are enclosed into the polymer fine particle, one where the inorganic pigment particle is enclosed into the polymer fine particle to which the surface the dye is adsorbed, or combination of these ones.

The volume average particle diameter of the polymer fine particle containing the dye and the inorganic pigment particle is preferably 5 to 200 nm, more preferably 50 to 150 nm. When the volume average particle diameter is less than 5 nm, it may be difficult to maintain the dispersed condition stably and thus particle coagulation and the accompanying viscosity increase may be induced, and when above 200 nm, the particle may settle out.

Dye

The dye may be properly selected depending on the application as long as capable of being enclosed into or adsorbed on the polymer fine particle. The dye is preferably water-insoluble and one of oil-soluble dyes and disperse dyes in view of more excellent enclosing property and adsorbing property. The term "water-insoluble" means that the dye does not dissolve in an amount of 10 parts by mass or more into 100 parts by mass of water at 20° C.

The oil-soluble dye is exemplified by yellow oil-soluble dyes, orange oil-soluble dyes, red oil-soluble dyes, violet oil-soluble dyes, blue oil-soluble dyes, green oil-soluble dyes, black oil-soluble dyes, etc.

The yellow oil-soluble dyes are exemplified by C.I. Solvent Yellow 5, C.I. Solvent Yellow 6, C.I. Solvent Yellow 14, C.I. Solvent Yellow 16, C.I. Solvent Yellow 21, C.I. Solvent Yellow 29, C.I. Solvent Yellow 33, C.I. Solvent Yellow 93, C.I. Solvent Yellow 114, C.I. Solvent Yellow 151, and C.I. Solvent Yellow 157.

The orange oil-soluble dyes are exemplified by, C.I. Solvent Orange 2, C.I. Solvent Orange 7, C.I. Solvent Orange 55, and C.I. Solvent Orange 60.

The red oil-soluble dyes are exemplified by C.I. Solvent Red 1, C.I. Solvent Red 3, C.I. Solvent Red 8, C.I. Solvent Red 18, C.I. Solvent Red 23, C.I. Solvent Red 24, C.I. Solvent Red 27, C.I. Solvent Red 43, C.I. Solvent Red 48, C.I. Solvent Red 49, C.I. Solvent Red 51, C.I. Solvent Red 52, C.I. Solvent Red 109, C.I. Solvent Red 111, C.I. Solvent Red 122, C.I. Solvent Red 125, C.I. Solvent Red 127, C.I. Solvent Red 130, C.I. Solvent Red 132, C.I. Solvent Red 135, C.I. Solvent Red 145, C.I. Solvent Red 146, C.I. Solvent Red 149, C.I. Solvent Red 150, C.I. Solvent Red 151, C.I. Solvent Red 155, C.I. Solvent Red 168, C.I. Solvent Red 176, C.I. Solvent Red 179, C.I. Solvent Red 180, C.I. Solvent Red 181, C.I. Solvent Red 195, C.I. Solvent Red 207, C.I. Solvent Red 218, C.I. Solvent Red 225, and C.I. Solvent Red 233.

The violet oil-soluble dyes are exemplified by C.I. Solvent Violet 13, C.I. Solvent Violet 31, C.I. Solvent Violet 36, C.I. Solvent Violet 37, C.I. Solvent Violet 57, and C.I. Solvent Violet 59.

The blue oil-soluble dyes are exemplified by C.I. Solvent Blue 14, C.I. Solvent Blue 25, C.I. Solvent Blue 35, C.I. Solvent Blue 36, C.I. Solvent Blue 38, C.I. Solvent Blue 44, C.I. Solvent Blue 63, C.I. Solvent Blue 67, C.I. Solvent Blue 70, C.I. Solvent Blue 78, C.I. Solvent Blue 83, C.I. Solvent Blue 87, C.I. Solvent Blue 94, C.I. Solvent Blue 104, C.I. Solvent Blue 105, C.I. Solvent Blue 132, and C.I. Solvent Blue 136.

The green oil-soluble dyes are exemplified by C.I. Solvent Blue 3, C.I. Solvent Blue 5, C.I. Solvent Blue 7, C.I. Solvent Blue 20, and C.I. Solvent Blue 28.

The black oil-soluble dyes are exemplified by C.I. Solvent Black 3 and C.I. Solvent Black 27.

The oil disperse dyes are exemplified by yellow disperse dyes, orange disperse dyes, red disperse dyes, violet disperse dyes, and blue disperse dyes.

The yellow disperse dyes are exemplified by C.I. Disperse Yellow 54, C.I. Disperse Yellow 64, C.I. Disperse Yellow 114, and C.I. Disperse Yellow 160.

The orange disperse dyes are exemplified by C.I. Disperse Orange 30.

The red disperse dyes are exemplified by C.I. Disperse Red 22, C.I. Disperse Red 60, C.I. Disperse Red 73, C.I. Disperse Red 177, and C.I. Disperse Red 356.

The violet disperse dyes are exemplified by C.I. Disperse Violet 57.

The blue disperse dyes are exemplified by C.I. Disperse Blue 56, C.I. Disperse Blue 60, C.I. Disperse Blue 73, C.I. Disperse Blue 106, and C.I. Disperse Blue 165.

The dye may be water-insoluble dyes that are treated into water-insoluble from various water-soluble dyes. The method to make water-soluble dyes into water-insoluble is preferably on the basis of forming an ion complex such as binding a cationic surfactant to an anionic dye.

Inorganic Pigment Particle

The inorganic pigment particle may be properly selected depending on the application; examples thereof include titanium dioxide particle, alumina particle, silica particle, iron oxide particle, iron hydroxide particle, and tin oxide particle. Among these, titanium dioxide particle, alumina particle, and silica particle are preferable in particular.

The shape of the inorganic pigment particle is preferably of lower aspect-ratio, and spherical shape is particularly preferable. The color of the inorganic pigment particle is preferably transparent or white.

The primary particle diameter of the inorganic pigment particle is preferably no more than 100 nm, more preferably 5 to 50 nm.

Polymer

The polymer of the polymer fine particle that contains the dye and the inorganic pigment particle may be properly selected from conventional ones; examples of the polymer include polyester resins, polyurethane resins, vinyl resins, acrylic resins, epoxy resins, olefin resins, polyimide resins, alkyd resins, fluorine resins, and silicone resins. Among these, polyester resins, polyurethane resins, vinyl resins, and acrylic resins are preferable since the polymer fine particle may be easily dispersed in aqueous dispersion media stably.

The polyester resins are exemplified by those prepared from polyvalent carboxylic acids and polyhydric alcohols. The polyvalent carboxylic acids are exemplified by aromatic dicarboxylic acids, aliphatic dicarboxylic acids, etc.

Examples of the aliphatic dicarboxylic acids include terephthalic acid, isophthalic acid, orthophthalic acid, 1,5-naphthalenedicarboxylic acid, 2,6-naphthalenedicarboxylic acid, diphenic acid, sulfoterephthalic acid, 5-sulfoisophthalic acid, hexahydrophthalic anhydride, 4-sulfophthalic acid, 4-sulfonaphtalene-2,7-dicarboxylic acid, 5-(4-sulfophenoxy)isophthalic acid, and sulfoterephthalic acid.

Examples of the aliphatic dicarboxylic acids include succinic acid, adipic acid, azelaic acid, sebacic acid, and dodecane dicarboxylic acid.

The other polyvalent carboxylic acids are exemplified by aromatic oxycarboxylic acids, alicyclic dicarboxylic acids, polyvalent carboxylic acids of trivalent or more.

The polyhydric alcohols are exemplified by aliphatic polyhydric alcohols. Examples of the aliphatic polyhydric alcohols include ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanemethanol, metaxylene glycol, orthoxylene glycol, 1,4-phenylene glycol, bisphenol A, and lactone polyester polyols.

The other polyhydric alcohols are exemplified by alicyclic polyhydric alcohols and aromatic polyhydric alcohols.

The polyurethane resins are exemplified by those prepared from isocyanates and compounds having a functional group capable of reacting with the isocyanates.

The polyurethane resins are also exemplified by resins prepared by polymerizing the isocyanates and one or more of the compounds having a functional group capable of reacting with the isocyanates.

The isocyanates are exemplified by aliphatic polyisocyanates, alicyclic polyisocyanates, and aromatic polyisocyanates.

Examples of the aliphatic polyisocyanates include ethylene diisocyanate, trimethylene diisocyanate, tetramethylene diisocyanate, hexamethylene diisocyanate, octamethylene diisocyanate, and nonamethylene diisocyanate.

Examples of the alicyclic polyisocyanates include isophorone diisocyanate, bis(isocyanatomethyl)cyclohexane, dicyclohexylmethane diisocyanate, cyclohexane diisocyanate, methylcyclohexane diisocyanate, and dicyclohexyldimethylmethane diisocyanate.

Examples of the aromatic polyisocyanates include phenylene diisocyanate, trilene diisocyanate, ethylphenylene diisocyanate, isopropylenephenylene diisocyanate, dimethylphenylene diisocyanate, diethyphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, and tridine diisocyanate.

The other isocyanates are exemplified by sulfur-containing aliphatic isocyanates, aliphatic disulfide isocyanates, aromatic sulfonic isocyanates, sulfonate isocyanates, aromatic sulfonic acid amides, and sulfur-containing heterocyclic compounds.

The compounds having a functional group capable of reacting with the isocyanates are exemplified by aliphatic polyols, aromatic polyols, and condensation reaction products between an organic acid and at least a polyol of aliphatic polyols and aromatic polyols.

Examples of the aliphatic polyols include ethylene glycol, diethylene glycol, triethylene glycol, tetraethylene glycol, propylene glycol, dipropylene glycol, butylene glycol, neopentyl glycol, glycerin, trimethylolethane, trimethylolpropane, butanetriol, 1,2-methylglycoside, pentaerythritol, dipentaerythritol, tripentaerythritol, sorbitol, erythritol, threitol, ribitol, arabinitol, xylitol, allitol, mannitol, dodecitol, iditol, glycol, inositol, hexanetriol, triglycerose, diglyperol, polyethylene glycol, polypropylene glycol, polytetraethylene glycol, tris(2-hydroxyethyl)cyanurate, cyclobutanediol, cyclopentanediol, cyclohexanediol, cycloheptanediol, cyclooctanediol, polylactonediol, cyclohexanedimethanol, hydroxypropyl cyclohexanol, dicyclohexanediol, cyclohexanetriol, maltitol, and lactitol.

Examples of the aromatic polyols include dihydroxynaphthalene, trihydroxynaphthalene, tetrahydroxynaphthalene, dihydroxybenzene, benzenetriol, biphenyltetraol, pyrogaol, (hydroxynaphthyl)pyrogallol, trihydroxyphenanthrene, bisphenol A, bisphenol F, xylylene glycol, and di(2-hydroxyethoxy)benzene.

Examples of the organic acid, in the condensation reaction product between the organic acid and the polyol, include oxalic acid, glutamic acid, adipic acid, acetic acid, isophthalic acid, salicylic acid, and pyromellitic acid.

The other compounds having a functional group capable of reacting with the isocyanates are exemplified by halogenated polyols, addition reaction products between the polyols and alkylene oxides such as ethylene oxide and propylene oxide, addition reaction products between alkylene polyamines and alkylene oxides, 2,2-dimethylol lactate, 2,2-dimethylol propionate, 2,2-dimethylol butanate, 2,2-dimethylol valerate, 3,4-diaminobutane sulfonic acid, 3,6-diamino-2-toluenesulfonic acid, caprolactone-modified products of these compounds, polyamino compounds, polythiol compounds, and alpha-amino acids. These may be used alone or in combination of two or more.

The vinyl resins and acrylic resins may be properly selected depending on the application; for example, those produced from polymerizable monomers described later are available.

The polymerizable monomers are exemplified by vinyl aromatic hydrocarbons, (meth)acrylates, and unsaturated carboxylic acids.

Examples of the vinyl aromatic hydrocarbons include styrene, o-methylstyrene, m-methylstyrene, p-methylstyrene, alpha-methylstyrene, p-ethylstyrene, 2,4-dimethylstyrene, p-tert-butylstyrene, p-chlorostyrene, and divinylbenzene.

Examples of the (meth)acrylate include methylacrylate, ethylacrylate, butylacrylate, n-propylacrylate, isopropylacrylate, n-butylacrylate, isobutylacrylate, t-butylacrylate, n-pentylacrylate, isopentylacrylate, neopentylacrylate, 3-(methyl)butylacrylate, 2-ethylhexylacrylate, cyclohexylacrylate, hexylacrylate, octylacrylate, nonylacrylate, decylacrylate, undecylacrylate, dodecylacrylate, phenylacrylate, methylmethacrylate, n-propylmethacrylate, isopropylmethacrylate n-butylmethacrylate, isobutylmethacrylate, t-butylmethacrylate, n-pentylmethacrylate, isopentylmethacrylate, neopentylmethacrylate, 3-(methyl)butylmethacrylate, 2-ethylhexylmethacrylate, hexylmethacrylate, octylmethacrylate, nonylmethacrylate, decylmethacrylate, undecylmethacrylate, and dodecylmethacrylate.

Examples of the unsaturated carboxylic acid include acrylic acid, methacrylic acid, itaconic acid, and maleic acid.

Examples of the other polymerizable monomers include (meth)acrylamide, N-substituted maleimide, maleic anhydride, (meth)acrylonitrile, vinyl ketone, vinyl acetate, and vinylidene chloride.

These polymerizable monomers may be used alone or in combination of two or more.

The polymer fine particle may exhibit excellent water dispersibility by way of providing the surface with an ionic group.

Examples of the ionic group include sulfonic acid group, carboxylic acid group, sulfuric acid group, phosphonic acid group, and phosphinic acid group, and also alkaline metal salt groups, ammonium salt groups, and primary to tertiary amine groups of these groups. Among these, preferable are alkaline metal salt groups of carboxylic acid, ammonium salt groups of carboxylic acid, alkaline metal salt groups of sulfonic acid, and ammonium salt groups of sulfonic acid. Furthermore, alkaline metal salt groups of sulfonic acid and ammonium salt groups of sulfonic acid are preferably in view of water dispersion stability.

The ionic groups may be provided by way of adding a monomer having an ionic group when synthesizing the resin.

The salts of the ionic groups may be of ammonium ion, Li, Na, K, Mg, Ca, Cu, Fe, etc. Among these, Li, K, and Na are more preferable since no gas generates and deposits are unlikely to yield.

In the present invention, the polymer fine particle may be dispersed in water by way of micro-encapsulating or emulsifying through coating a hydrophilic polymer on a colorant that is substantially insoluble in water and soluble in organic solvents.

The process to coat the dye or the inorganic pigment particle with a polymer to produce the fine particle may be properly selected from conventional processes, for example, interface deposition processes and interfacial polymerization processes are available.

The interface deposition processes, suited to inkjet inks, may be specifically a phase-transfer emulsion process or an acid deposition process.

In the phase-transfer emulsion process, a polymer and a water-insoluble dye are dispersed in an organic solvent having low compatibility with water and a boiling point higher than that of water, the polymer is hydrophilized and then emulsified through adding water, followed by distilling away the organic solvent thereby to transfer into an aqueous phase.

In the acid deposition process, a polymer and a water-insoluble dye are dispersed in an aqueous medium, the polymer is hydrophobized through adding an acid thereby to make the polymer adsorbed firmly to the particle of the water-insoluble dye, and a base is applied to the polymer after water-rinsing to hydrophilize again thereby to disperse in an aqueous medium.

Specifically, the acid deposition process is carried out in a way that the polymer is hydrophilized by adding a basic compound to neutralize an acidic group such as carboxylic group and the hydrophilized polymer is dissolved in an aqueous medium, to which a pigment is added and wetted, then the mixture is treated with homogenizers able to stir at high speed, milling and dispersing devices with balls such as bead mills and ball mills, kneading and dispersing devices such as roll mills by means of shear force, or ultrasonic dispersing devices, thereby the pigment particle is dispersed in the aqueous medium in a condition that the pigment particle is enclosed by the polymer.

The basic compound may be inorganic compounds such as sodium hydroxide, potassium hydroxide, and lithium hydroxide, or organic amines such as diethanolamine, dimethylethanolamine, triethanolamine, diisopropanolamine, for example.

In cases where a surfactant is added as a dispersing aid, the amount of the surfactant is necessary to be as small as possible in a range that the printing quality and water resistance are not impaired.

An acid is added to the resulting dispersion to oxidize the carboxylic acid etc. and to make the polymer water-insoluble, thereby the polymer is deposited on the pigment particle to make adsorb more firmly. In this stage, the pigment particle settles out at the bottom of the aqueous medium in a paste-like condition.

The acid may be inorganic acids or organic acids, for example; the inorganic acid may be hydrochloric acid, sulfuric acid, nitric acid, or phosphoric acid, for example; the organic acid may be formic acid or acetic acid, for example. The pH is preferably 2 to 6 after the acid deposition. It is preferred that the amount of the acid is in a range that the acid does not induce property change of the polymer.

Suction filtration, pressure filtration, or centrifugal separation may be employed to neutralize the paste and to separate the paste and water. The neutralized paste is hydrophilized again by adding a basic substance to disperse in an aqueous medium. The basic substance may be the inorganic salts or the organic amines described above.

An emulsion polymerization process may be favorably employed among the interfacial polymerization processes, and the process is carried out within an inert solvent such as deionized water in the presence of a polymerization initiator.

The polymerization initiator may be redox polymerization initiators that use a persulfate, a perborate, or a peroxide, and a reducer at the same time.

Examples of the persulfate include potassium peroxodisulfate, sodium peroxodisulfate, and ammonium persulfate. Examples of the perborate include sodium perborate, potassium perborate, and ammonium perborate.

Examples of the peroxide in the redox polymerization initiator include the persulfates and the perborates described above. Examples of the reducer in the redox polymerization include sodium sulfite, sodium subsulfite, and ferrous sulfate.

The reaction temperature in the emulsion polymerization process may be properly selected depending on the species of reactants and solvents, etc.; preferably the reaction temperature is room temperature to 100° C.

The reaction period in the emulsion polymerization process may be properly selected depending on the species of reactants and solvents, etc.; preferably the reaction period is 3 to 20 hours.

After the reaction is completed in the emulsion polymerization process, a polymer emulsion containing an emulsifying agent can be obtained through conventional means such as neutralization.

The content of the dye in the polymer fine particle, which contains the dye and the inorganic fine particle, is preferably 10% to 80% by mass based on the total solid content of the polymer fine particle, more preferably 20% to 60% by mass. When the content is less than 10% by mass, the color saturation and/or image density of ink recorded matters may be insufficient, and when the content is above 80% by mass, the storage stability of the ink may be impaired. The content of the inorganic pigment particle in the polymer fine particle, which contains the dye and the inorganic fine particle, is preferably 5% to 60% by mass based on the total solid content of the polymer fine particle, more preferably 10% to 40% by mass.

The solid content of the polymer fine particle, which contains the dye and the inorganic fine particle, is preferably 2% to 40% by mass based on the total solid content of the ink composition, more preferably 5% to 20% by mass.

Water-Soluble Solvent

The water-soluble solvent is intended to prevent the drying of ink compositions that employ water as the liquid medium and/or to enhance the dispersion stability.

The water-soluble solvent is exemplified by polyhydric alcohols, polyhydric alcohol alkylethers, polyhydric alcohol arylethers, nitrogen-containing heterocyclic compounds, amides, amines, sulfur-containing compounds, propylene carbonate, ethylene carbonate, and the like. These may be used alone or in combination of two or more.

Examples of the polyhydric alcohols include glycerin, diethylene glycol, 1,3-butanediol, 3-methyl-1,3-butanediol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol, and the like.

Examples of the polyhydric alcohol alkyl ethers include ethylene glycol monoethyl ether, ethylene glycol monobutyl ether, diethylene glycol monomethyl ether, diethylene glycol monoethyl et her, diethylene glycol monobutyl ether, tetraethylene glycol monomethyl ether, propylene glycol monoethyl ether, and the like.

Examples of the polyhydric alcohol arylethers include ethylene glycol monophenyl ether, ethylene glycol monobenzyl ether, and the like.

Examples of the nitrogen-containing heterocyclic compounds include 2-pyrrolidone, N-methyl-2-pyrrolidone, N-hydroxyethyl-2-pyrrolidone, 1,3-dimethyl imidazoledione, epsilon-caprolactam, gamma-butyrolactone, and the like.

Examples of the amides include formamide, N-methyl formamide, N,N-dimethyl formamide, and the like.

Examples of the amines include monoethanolamine, diethanolamine, triethanolamine, monoethylamine, diethylamine, triethylamine, and the like.

Examples of the sulfur-containing compounds include dimethyl sulfoxide, sulfolane, thiodiethanol, and the like.

Among these, glycerin, diethylene glycol, triethylene glycol, 1,3-butanediol, 1,6-hexanediol, propylene glycol, 1,5-pentanediol, dipropylene glycol, trimethylolpropane, and 3-methyl-1,3-butanediol are preferable in view of superior effects to prevent erroneous injection by virtue of solubility and moisture evaporation, excellent storage stability, and superior ejection stability.

It is preferred that the water-soluble solvent contains a saccharide; the saccharide is exemplified by monomeric sugars, two sugars, oligosaccharides such as trisaccharides and tetrasaccharides, and polysaccharides.

Specific examples the saccharide include glucose, mannose, fructose, ribose, xylose, arabinose, galactose, maltose, cellobiose, lactose, sucrose, trehalose, malt triose, and the like.

The term of the polysaccharides refers to sugars in the broad sense of the term, and includes substances widely found in nature such as alpha-cyclodextrins and celluloses. The sugars encompass derivatives of sugars. The derivatives of sugars are exemplified by reduced sugars, oxidized sugars, amino acids, or thioacids of the sugars.

The reduced sugars are exemplified by sugar alcohols. The sugar alcohols may be the compounds expressed by the formula below. Specific examples of the sugar alcohols include maltitol and sorbit.

$$HOCH_2(CHOH)_nCH_2OH$$

in the formula above, "n" represents an integer of 2 to 5.

Examples of the oxidized sugars include aldonic acid and uronic acids. Among these, sugar alcohols are preferable.

It is preferred that the content of the water-soluble solvent is 10% to 50% by mass based on the entire amount of the ink composition. When the content is below 10% by mass, the ejected ink droplets may fly toward non-straight direction or the ink cannot be ejected due to viscosity increase since the ink tends to dry within nozzles, and when the content is above 50% may mass, the storage stability of the ink may be inferior.

The rate of the water-soluble solvent to the solid content of the polymer fine particle containing the dye and the inorganic pigment particle (mass of the water-soluble solvent/mass of the solid in the polymer fine particle containing the dye and the inorganic pigment particle) considerably affects the stability of the ink ejected from heads. When the content of humectants is low in spite that the solid content of the polymer fine particle containing the dye and the inorganic pigment particle is high, the ink promotes moisture evaporation around the meniscus of nozzles, possibly resulting in defective injection.

The rate of the water-soluble solvent to the solid content of the polymer fine particle containing the dye and the inorganic pigment particle (mass of the water-soluble solvent/mass of the solid in the polymer fine particle containing the dye and the inorganic pigment particle) is preferably 0.25 to 25, more preferably 1 to 8, particularly preferably 2 to 4. When the rate of the water-soluble solvent to the solid content of the polymer fine particle containing the dye and the inorganic pigment particle is within the range, the ink composition may be very superior in drying property, storage property, and reliability.

Wetting Agent

When the wetting agent is added to the ink composition, the surface tension is decreased, and the infiltration of the ink droplets applied on recording media such as paper is promoted, consequently, feathering and/or color bleeding can be mitigated.

The wetting agent may be properly selected as long as adapted to adjust the surface tension in a range of 20 to 35 mN/m, and such surfactants may be suited that do not impair dispersibility in combination with the species of dyes and water-soluble solvents.

The species of the wetting agent may be anionic surfactants, nonionic surfactants, etc.

Examples of the anionic surfactants include polyoxyethylene alkylether acetates, dodecylbenzene sulfonates, laureates, polyoxyethylene alkylether sulfates, and fluorine-containing surfactants.

Examples of the nonionic surfactants include polyols, glycol ethers, polyoxyethylene alkyl ethers, polyoxyethylene alkyl esters, polyoxyethylene sorbitan fatty esters, polyoxyethylene alkylphenyl ethers, polyoxyethylene alkylamines, polyoxyethylene alkylamides, acetylene glycols, and fluorine-containing surfactants.

Specific examples of the acetylene glycol surfactants are 2,4,7,9-tetramethyl-5-decyne-4,7-diol, 3,6-dimethyl-4-octine-3,6-diol, 3,5-dimethyl-1-hexine-3-ol, etc.

The acetylene glycol surfactant may be commercially available ones; examples thereof include Surfynol 104, 82, 465, 485, and TG (by Air Products Co., USA). Among these, Surfynol 465, 104, and TG are preferable in view of superior printing quality.

Examples of the fluorine-containing surfactants include perfluoroalkyl sulfonates, perfluoroalkyl carboxylates, perfluoroalkyl phosphate esters, perfluoroalkyl ethyleneoxide adducts, perfluoroalkylbetains, perfluoroalkylamine oxides, and perfluoroalkylether compounds.

The fluorine-containing surfactants may be commercially available ones; examples thereof include Surflon S-111, S-112, S-113, S-121, S-131, S-132, S-141, S-145 (by Asahi Glass Co., Ltd.), Fullard FC-93, FC-95, FC-98, FC-129, FC-135, FC-170C, FC-430, FC-431 (by Sumitomo 3M Ltd.), Megafac F-470, F1405, F-474 (by Dainippon Ink And Chemicals, Inc.), Zonyl TBS, FSP, FSA, FSN-100, FSN, FSO-100, FSO, FS-300, UR (by DuPont), FT-110, FT-250, FT-251, FT-400S (by Neos Co.). These may be used alone or in combination of two or more.

Specific examples of the wetting agent are the compounds expressed by the formulas below.

  General Formula (1)

in General Formula (1) above, $R^2$ represents an alkyl group having 6 to 14 carbon atoms which may be branched; $M^2$ represents one of alkaline metals, quaternary ammoniums, quaternary phosphoniums, and alkanolamines; "m" is an integer of 3 to 12;

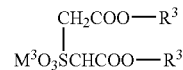  General Formula (2)

in General Formula (2) above, $R^3$ represents an alkyl group having 5 to 16 carbon atoms which may be branched; $M^3$ represents one of alkaline metals, quaternary ammoniums, quaternary phosphoniums, and alkanolamines;

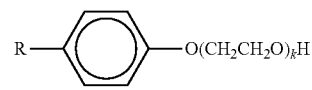  General Formula (3)

in General Formula (3) above, R represents a hydrocarbon group having 6 to 14 carbon atoms which may be branched; "k" is an integer of 5 to 20;

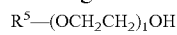  General Formula (4)

in General Formula (4) above, $R^5$ represents a hydrocarbon group having 6 to 14 carbon atoms which may be branched; "l" is an integer of 5 to 20;

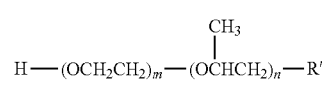  General Formula (5)

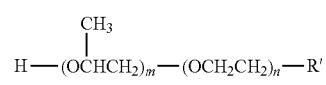  General Formula (6)

in General Formulas (5) and (6) above, R' each independently represents a hydrocarbon group having 6 to 14 carbon atoms; "m" and "n" each independently represents an integer of 20 or less;

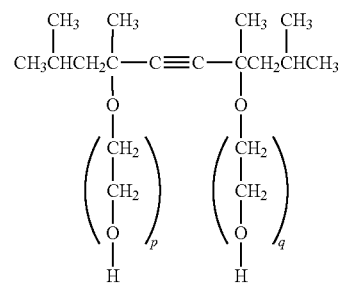  General Formula (7)

in General Formula (7) above, "p" and "q" each independently represents an integer of 0 to 40;

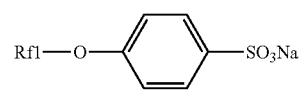  General Formula (8)

in General Formula (8) above, Rf1 represents a group expressed by General Formula (9)-1 or (9)-2 below.

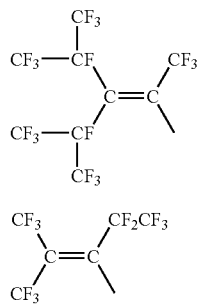

General Formula (9)-1

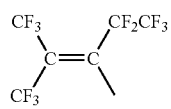

General Formula (9)-2

The wetting agent is preferably water-soluble organic solvents such as polyol compounds and glycol ether compounds. It is more preferred, among these, that at least one of polyol compounds having 8 or more carbon atoms and glycol ether compounds is employed.

When the polyol compound has carbon atoms of less than 8, printing quality or image density may be deteriorated since the infiltrating property is insufficient, recording media are soiled, and extending of the ink composition is insufficient on recording media and thus filling of pixels is impaired.

The polyol compounds having 8 or more carbon atoms are preferably 2-ethyl-1,3-hexanediol (solubility: 4.2% at 25° C.), 2,2,4-trimethyl-1,3-pentanediol (solubility: 2.0% at 25° C.), etc.

The glycol ether compound may be properly selected depending on the application; examples thereof include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether.

The content of the wetting agent may be properly selected depending on the application; preferably, the content is 0.1 to 10% by mass based on the total amount of the ink composition, more preferably 1% to 5% by mass.

Other Ingredients

The other ingredients are, for example, pH adjuster, antiseptic/antifungal agent, chelating agent, anticorrosive agent, anti-kogation agent, water-soluble ultraviolet absorber, water-soluble infrared absorber, etc.

pH Adjuster

The pH adjuster stabilizes the dispersed condition to stabilize the ejection by way of maintaining the ink composition at an alkalinity. When the pH of the ink composition is no less than 11, the level to dissolve out inkjet heads or ink-supplying units tends to be significant, thus such problems may occur as deterioration, leakage, or inferior injection of the ink.

It is preferred that the pH adjuster is added at the stage of mixing and dispersing a dye with a dispersant into water rather than adding with a water-soluble solvent, wetting agent, etc. after the stage of mixing and dispersing since the some species of pH adjusters may impair the dispersion.

The pH adjuster may be, for example, alcohol amines, alkaline metal hydroxides, ammonium hydroxides, phosphonium hydroxides, and alkaline metal carbonates. These may be used alone or in combination of two or more.

Examples of the alcohol amines include diethanolamine, triethanolamine, 2-amino-2-ethyl-1,3-propanediol; examples of the alkaline metal hydroxides include lithium hydroxide, sodium hydroxide, and potassium hydroxide; examples of the ammonium hydroxides include ammonium hydroxide and quaternary ammonium hydroxide; examples of the phosphonium hydroxides include quaternary hydroxide; examples of the alkaline metal carbonates include lithium carbonate, sodium carbonate, and potassium carbonate.

Antiseptic/Antifungal Agent

Examples of the antiseptic/antifungal agents include sodium dehydroacetate, sodium sorbate, sodium 2-pyridinethiol-1-oxide, sodium benzoate, and sodium pentachlorophenol.

Chelating Agent

Examples of the chelating reagents include sodium ethylenediamine tetraacetate, sodium nitrilotriacetate, sodium hydroxyethyl ethylenediamine triacetate, sodium diethylenetriamine pentaacetate, and sodium uramil diacetate.

Anticorrosive Agent

Examples of the antirust agents include, acidic sulfite salts, sodium thiosulfate, thiodiglycolic acid ammonium, diisopropylammonium nitrite, pentaerythritol tetranitrate, and dicyclohexylammonium nitrite.

Anti-Kogation Agent

Kogation can be prevented by way of incorporating the anti-kogation agent into the ink composition.

The kogation is a problem inherent to thermal heads, where an electric current is supplied to a heater to heat instantaneously an ink composition and the ink composition is ejected by action of the pressure caused from the heated ink composition, and refers to such a phenomenon that the ingredients of the ink composition cause a property change upon being heated and the resulting substances adhere on the heater. When the kogation is induced, heating by the heater comes to abnormal, resulting in weaker injection pressure or possibly non-injection of the ink composition in the worst case.

Examples of the anti-kogation agent include polyphosphoric acid, polyamino carboxylic acid, aldonic acid, hydroxycarboxylic acid, polyol phosphate esters, salts of these compounds, acids or salts having amino group, and ammonium salts having methyl or methylene group and carboxyl group.

Recording Medium

The recording medium comprises a support, a coating layer on at least one side of the support, and other layers as required.

The amount of pure water transferred to the recording medium is no less than 2 ml/m² and less than 35 ml/m² at a contact period of 100 ms, preferably 2.5 to 15 ml/m² by measurement of the dynamic scanning absorptometer. When the transferred amount of pure water is below 2 ml/m² at a contact period of 100 ms, the beading may easily occur, and when above 35 ml/m², the recorded ink dots may be too small compared to the intended diameter.

The amount of pure water transferred to the recording medium is no less than 3 ml/m² and less than 40 ml/m² at a contact period of 400 ms by measurement of the dynamic scanning absorptometer, preferably 3.5 to 25 ml/m² by measurement of the dynamic scanning absorptometer. When the transferred amount of pure water is below 3 ml/m² at a contact period of 400 ms, spur traces tend to generate due to insufficient drying property, and when above 40 ml/m², the gloss of image portions may be low after drying.

The dynamic scanning absorptometer (DSA, Japan TAPPI Journal, vol. 48, May 1994, pp. 88-92, Shigenori Kuga) is an apparatus that can determine the amount of liquid absorbed in a very short period. The dynamic scanning absorptometer automatically measures the absorbed amount in a way that the velocity to absorb a liquid is directly read on the basis of movement of a meniscus within a capillary, the sample is disc-like, a head to absorb the liquid is scanned spirally on the sample, the scanning velocity is automatically changed in accordance with a predetermined pattern, and a necessary number of measurements are repeated per sample. A head to supply the liquid to the paper sample is connected to the capillary through a Teflon® tube, and the site of the meniscus within the capillary is automatically read by an optical sensor. Specifically, the amount of transferred water was measured using a dynamic scanning absorptometer (K350 series D type, Kyowaseiko Co.). The transferred amounts at contact periods of 100 ms and 400 ms can be determined respectively by way of interpolating the measurements of the transferred amounts at near the contact periods of the intended contact period.

Support

The support may be properly selected depending on the application; examples thereof include papers based on wood fibers, and sheet substances such as nonwoven fabrics based on wood or synthetic fibers.

The paper may be properly selected from conventional ones and may be produced from wood pulp or waste paper pulp. Examples of the wood pulp include broad-leaf kraft pulp (LBKP), needle-leaf kraft pulp (NBKP), LBSB, GP, and TMP.

The raw material of the waste paper pulp may be white shaving paper (johaku), ruled white paper (keihaku), creamy white paper (cream haku), card, special white paper (tokuhaku), medium white paper (chuhaku), flyleaf shaving paper (mozou), fair paper (irohaku), Kent paper, white art paper (shiro art), finest cut paper (tokujogiri), special cut paper (betsujogiri), newspaper, magazine paper, etc., as shown in the standard table for waste paper standard quality (by Waste Paper Regeneration Acceleration Center Foundation). More specifically, the waste papers are chemical pulp papers and high yield pulp-containing papers; examples thereof are printer papers such as non-coated computer papers, heat-sensitive papers, and pressure-sensitive papers; OA waste papers such as PPC papers; coated papers such as art papers, coat papers, slightly coated papers (bitoko papers), and matte papers; non-coated papers such as wood-free papers, color wood-free papers, notebook papers, letter papers, packing papers, fancy papers, wood-containing papers, newspapers, ground-wood papers, super-calendered papers, flyleaf shaving papers, pure white machine glazed papers, and milk cartons. These may be used alone or in combination of two or more.

The waste paper pulp is typically produced by combining four steps below.

(1) in separating and loosening step, waste paper is treated with mechanical force and chemicals to loose into fibers, and printing inks are removed from the fibers;
(2) in dust removing step, foreign matters such as plastics in the waste paper are removed by screens, cleaners, etc.;
(3) in ink step, printing inks separated from fibers using surfactants are removed away by floatation or cleaning processes;
(4) in bleaching step, fibers is subjected to oxidizing or reducing action to enhance the whiteness of the fibers.

When the waste paper is mixed, the mixing ratio of the waste paper is preferably no more than 40% by mass based on the entire solid content of the total pulp. The mixing ratio of no more than 40% by mass may suppress curling of recording media after recording.

The internal filler, used for the support, may be conventional white pigments. Examples of the white pigment include white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, and magnesium hydroxide; and organic white pigments such as styrene plastic pigment, acrylic plastic pigment, polyethylene microcapsules, urea resin, and melamine resin. These may be used alone or in combination of two or more.

The internal sizing agent used for the support in the production is exemplified by neutral rosin sizing agents, alkenyl succinic anhydrides (ASA), alkyl ketene dimmers (AKD), and petroleum resin sizing agents, which are typically used for producing neutral paper; among these, neutral rosin sizing agents and alkenyl succinic anhydrides are preferable. The alkyl ketene dimmers may be used in a smaller amount due to its higher sizing effect, however, may be undesirable from the viewpoint of transportability at inkjet recording since the frictional coefficient tends to be lowered at the surface of recording paper (medium).

Coating Layer

The coating layer comprises a pigment, a binder, and optional other ingredients such as surfactant as required.

The pigment may be inorganic pigments, combinations of inorganic pigments and organic pigments, etc.

Examples of the inorganic pigments include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite.

Among these, kaolin is particularly preferable in view of excellent gloss-generating ability and ability to provide texture similar as that of offset printing paper.

Specific examples of the kaolin are delaminated kaolin, calcinated kaolin, engineered kaolin with surface modification, etc.

It is preferred that the content of the kaolin, which having a rate of 80% by mass or more in terms of those having a particle diameter of 2 μm or less, is 50% by mass or more based on the total solid amount of the kaolin.

The content of the kaolin is preferably 50 parts by mass or more based on 100 parts by mass of the binder. When the content is below 50 parts by mass, the effect on gloss level may be insufficient.

The upper limit of the content is not defined specifically, preferably, the content is no more than 90 parts by mass in view of flowability of the kaolin and viscosity increase under higher shearing force in particular.

The organic pigment may be water-soluble styrene-acrylic copolymer particles, styrene-butadiene copolymer particles, polystyrene particles, polyethylene particles, etc. These may be used alone or in combination of two or more.

The content of the organic pigment is preferably 2 to 20 parts by mass based on 100 parts by mass of total pigment in the coating layer.

The organic pigment may afford such effects as gloss generating ability is excellent and the coating layer is highly voluminal, highly glossy, and excellent in surface-coating property since the specific gravities are relatively low compared to those of inorganic pigments.

When the content of the organic pigment is below 2 parts by mass, these effects may be negligible, and when the content is above 20 parts by mass, the flowability of the coating liquid is impaired to bring about lower coating workability and the cost is not economical.

The shape of the organic pigment may be properly selected depending on the application; for example, the shape may be solid, hollow, or donut-like. Among these, the hollow shape with a void ratio of 40% or more is preferable from the view point of well balanced gloss-generating ability, surface-coating ability, and flowability of the coating liquid. The average particle diameter of the organic pigment is preferably 0.2 to 3.0 μm also from the view point of well balanced gloss-generating ability, surface-coating ability, and flowability of the coating liquid.

The binder may be properly selected depending on the application; preferably the binder is aqueous polymers.

The aqueous polymer may be, for example, water-soluble polymers, water-dispersible polymers, etc. These may be used alone or in combination of two or more.

The water-soluble polymer may be properly selected depending on the application; examples thereof include polyvinyl alcohol; anion-modified polyvinyl alcohol, cation-modified polyvinyl alcohol, acetal-modified polyvinyl alcohol; polyurethane; polyvinyl pyrrolidone; modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, and hydroxypropylcellulose; modified cellulose such as cationized hydroxyethyl cellulose; polyester, polyacrylic acid (ester), melamine resin, or modified derivatives of these substances; synthetic resin made of polyester-polyurethane copolymer; and other substances such as poly(meth)acrylic acid, poly(meth)acryl amide, oxidized starch, phosphorylated starch, self-denatured starch, cationized starch, other modified starches, polyethylene oxide, sodium polyacrylate, and sodium alginate. The above substances may be used alone or in combination.

Among these, preferable are polyvinyl alcohol, cation-modified polyvinyl alcohol, acetal-modified polyvinyl alcohol, polyester, polyurethane, and polyester-polyurethane copolymers in view of ink absorbability.

The water-dispersible polymer may be properly selected depending on the application; examples thereof include polyvinyl acetate, polyethylene-polyvinyl acetate copolymers, polystyrene, styrene-(meth)acrylate copolymer, (meth)acrylate polymer, polyvinyl acetate-(meth)acrylate copolymers, styrene-butadiene copolymer, ethylene-propylene copolymers, polyvinyl ether, and silicone-acrylic copolymer.

The water-dispersible resin may contain a crosslinking agent or be a self-crosslinkable copolymer. The crosslinking agent may be methylol melamine, methylol urea, methylol hydroxypropylene urea, or isocyanate. The self-crosslinkable copolymer is exemplified by copolymers having a unit of N-methylol acrylamide.

The content of the aqueous polymer is preferably 2 to 100 parts by mass based on 100 parts by mass of the pigment, more preferably 3 to 50 parts by mass. The amount of the aqueous polymer is determined such that the amount of water transferred to the recording medium comes into a desirable range.

When the dye in the ink composition is water-dispersible, a cationic organic compound may be formulated into the coating layer depending on the application.

The cationic organic compound may be primary to tertiary amines, monomers, oligomers, or polymers of quaternary ammonium salts that react with sulfonic group, carboxyl group, or amino group of a direct dye or an acid dye in a water-soluble ink to form an insoluble salt; may be used. Among these, preferable are primary to tertiary amines, and oligomers or polymers of quaternary ammonium salts.

The cationic organic compound may be, for example, dimethylamine-epichlorohydrin polycondensate, dimethylamine-ammonia-epichlorohydrin condensate, pol(trimethyl aminoethyl-methacrylate methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymer, dicyandiamide, dicyandiamide-ammonium chloride-urea-formaldehyde condensate, polyalkylene polyamine-dicyandiamide ammonium salt condensate, dimethyl diallyl ammonium chloride, polydiallylmethylamine hydrochloride, poly(diallyl dimethyl ammonium chloride), poly(diallyl dimethyl ammonium chloride-sulfur dioxide), poly(diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamine polymer, and modified polyethylenimine alkylene oxide. These may be used alone or in combination of two or more.

It is preferable among others to use a cationic organic compound with a lower molecular mass in combination with another cationic organic compound with a higher molecular mass. The combination of a cationic organic compound with a lower molecular mass and another cationic organic compound with a higher molecular mass may lead to improve image density and to reduce feathering.

The cationic organic compound with a lower molecular mass is preferably dimethylamine-epichlorohydrin polycondensate or polyallylamine hydrochlorid, and the cationic organic compound with a higher molecular mass is preferably poly (diallyl dimethyl ammonium chloride), for example.

Cation equivalent of the cationic organic compound is preferably 3 to 8 meq/g in accordance with a colloid titration method (by use of potassium sulfate and toluidine blue). The cationic organic compound of this range may lead to a preferable range of dry deposition amount described below.

In the measurement of the cation equivalent in accordance with the colloid titration method, the cationic organic compound is diluted into a solid content of 0.1% by mass with distilled water without adjusting pH.

The dry deposition amount of the cationic organic compound is preferably between 0.3 and 2.0 $g/m^2$. When the dry deposition amount of the cationic organic compound is lower than 0.3 $g/m^2$, the effects to improve image density and/or to decrease feathering may be insufficient.

Surfactant

When the surfactant is added to the coating layer, images may be improved for the water resistance, image density may be increased, and bleeding may be mitigated.

The surfactant may be properly selected used depending on the purpose; the surfactant may be anionic surfactants, cationic surfactants, amphoteric surfactants, or nonionic surfactants may be used. Among these, nonionic surfactants are preferable in particular.

The nonionic surfactant is exemplified by higher alcohol ethylene oxide adducts, alkylphenol ethylene oxide adducts, fatty acid ethylene oxide adducts, polyhydric alcohol fatty acid ester ethylene oxide adducts, higher aliphatic amine ethylene oxide adducts, fatty acid amide ethylene oxide adducts, fatty oil ethylene oxide adducts, ethylene oxide adducts of fats, polypropylene glycol ethylene oxide adducts, glycerol fatty acid esters, pentaerythritol fatty acid esters, sorbitol-sorbitan fatty acid esters, sucrose fatty acid esters, polyhydric alcohol alkyl ethers, and alkanolamine fatty acid amides. These may be used alone or in combination.

The polyhydric alcohol may be properly selected depending on the application; examples thereof include glycerol, trimethylolpropane, pentaerythrite, sorbitol, and simple sugar.

The ethylene oxide adducts described above may be those of which a part of ethylene oxide is substituted to alkylene oxides such as propylene oxide and butylene oxide to an extent capable of maintaining the water solubility.

The substituted rate of the alkylene oxides in the ethylene oxide adducts is preferably no more than 50%. The HLB (ratio of hydrophilic/oleophilic) of the nonionic surfactants is preferably 4 to 15, more preferably 7 to 13.

The content of the surfactants is preferably 0 to 10 parts by mass based on 100 parts by mass of the cationic organic compounds described above, more preferably 0.1 to 1.0 part by mass.

The coating layer may be added with other optional ingredients as required. The other ingredients may be alumina powder, pH adjuster, antiseptic agent, antioxidant, or other additives.

The method for forming the coating layer may be properly selected depending on the application, i.e. the coating layer may be formed by impregnating or coating the coating liquid on the support.

The process to impregnate or to coat the coating liquid may be properly selected depending on the application; for example, the coating is carried out by various coating devices such as conventional size presses, gate roll size presses, film transfer size presses, blade coaters, rod coaters, air knife coaters, curtain coaters, alternatively, conventional size presses, gate roll size presses, or film transfer size presses, equipped paper machines, are employed to impregnate or coat the coating liquid. Among these, on machine finished processes are economically reasonable.

The deposition amount of the coating liquid may be properly selected depending on the application; preferably, the deposition amount is 0.5 to 20 $g/m^2$ as solid, more preferably 1 to 15 $g/m^2$. The coating is dried as required after impregnating or coating. The drying temperature may be properly selected; preferably, the temperature is 100° C. to 250° C.

The recording medium may be provided with a back layer at the backside of the support; in addition, other layers may be formed between the support and the back layer, or a protective layer may be formed on the coating layer. These layers may be of monolayer or multilayer.

Ink Cartridge

The inventive ink cartridges have an ink composition of the inventive ink-media set in a container and other optional members as required.

The container may be, without limitation, appropriately selected in terms of shape, structure, size, and material, depending on the purpose; preferable examples thereof are ink bags formed of aluminum-laminate films or resin films.

Inkjet Recording Apparatus and Inkjet Recording Method

The inventive inkjet recording apparatuses have at least an ink ejecting unit and other optional units such as a stimulus generation unit and a control unit.

The inventive inkjet recording method involves at least an ink ejecting step and also other optional steps such as a stimulus generation step and a control step. The inventive inkjet recording method may be suitably carried out by the inventive inkjet recording apparatus; the ink ejecting step may be suitably carried out by the ink ejecting unit; and the other steps may be suitably carried out by the other units.

The ink cartridge, inkjet recording method, and inkjet recording apparatus according to the present invention will be explained with reference to the attached figures, but the descriptions below concern to no more than a part of inventive embodiments and will define the present invention in no way.

FIG. 1 is a schematic front view of a mechanism section of a serial inkjet recording apparatus that mounts therein an ink cartridge equipped with a recording liquid receiver that contains the inventive ink composition.

The mechanism section of the inkjet recording apparatus has such a configuration that a main-supporting guide rod 3 and a sub-supporting guide rod 4 are suspended substantially horizontally between side plates 1 and 2 at both sides, and a carriage unit 5 is supported in a manner of freely sidable in the main scanning direction by the main-supporting rod 3 and the sub-supporting rod 4. The carriage unit 5 incorporates therein four inkjet heads 6 respectively ejecting a yellow ink (Y), a magenta ink (M), a cyan ink (C), and a black ink (Bk), with ejection faces 6a (nozzle face) directing downward. At the upper side of the inkjet heads 6 of the carriage unit 5, four ink cartridges 7y, 7m, 7c, 7k to supply the inks to the four heads 6 are detachably installed.

Figure 2:
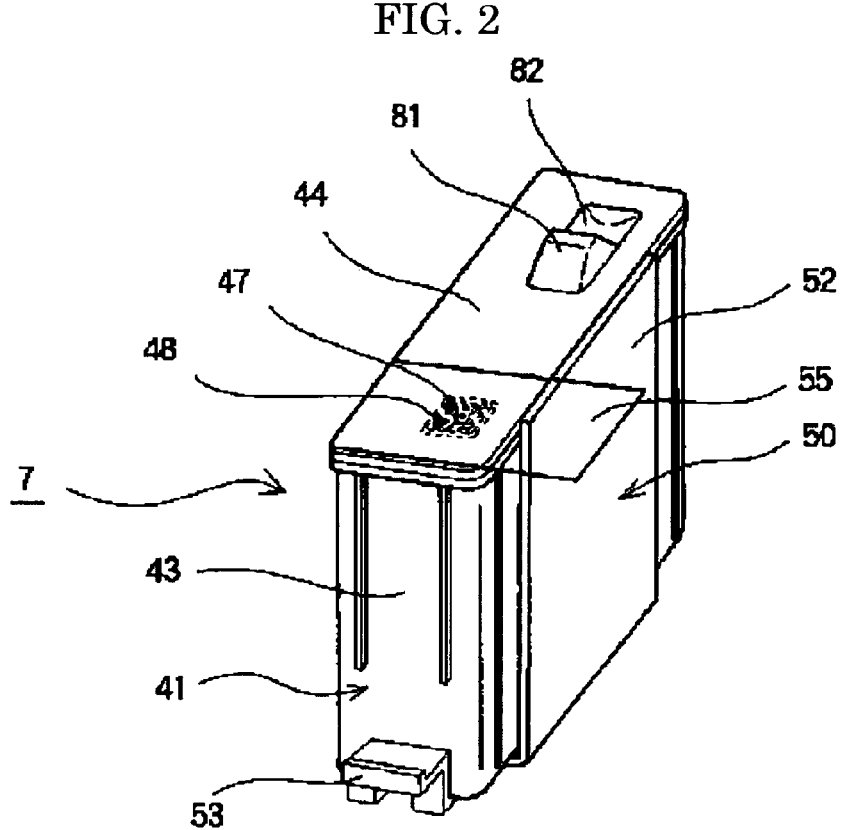
FIG. 2 is an outline perspective view that exemplarily shows an ink cartridge prior to attaching to an inkjet recording apparatus according to the present invention.
Figure 3:
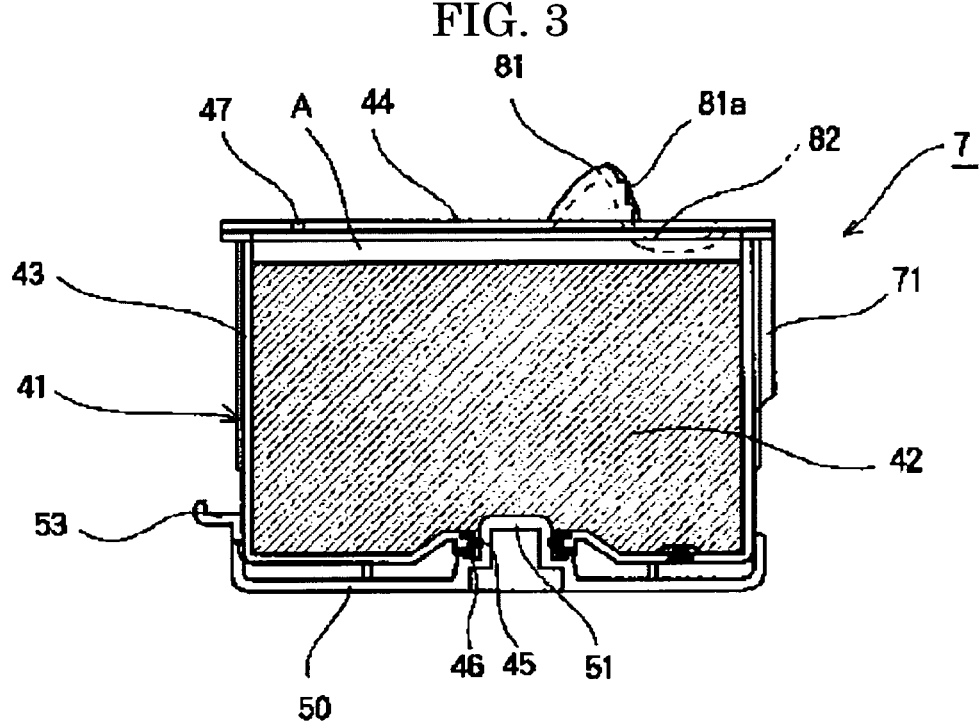
FIG. 3 is a sectional front view of the ink cartridge of FIG. 2.

The ink cartridge 7 will be explained with reference to FIGS. 2 and 3 in the following. FIG. 2 is an external perspective view of the ink cartridge before mounting onto the recording apparatus; FIG. 3 is a front cross section of the ink cartridge.

As shown FIG. 3, the ink cartridge 7 has a cartridge body 41 that contains an ink absorbent 42 to which an ink of specific color is absorbed. The cartridge body 41 is so formed that an upper cover member 44 is adhered or welded to an upper opening of a case 43, and is a mold which is made of a resin shaped body, for example. The ink absorbent 42 is made of porous body such as urethane foam etc., to which an ink is absorbed after being compressively inserted in the cartridge body 41.

The case 43 of the cartridge body 41 has a base portion which is formed with an ink supply port 45 for feeding the ink to the recording head 6, and the ink supply port 45 has an inner periphery to mating with a seal ring 46. The upper cover member 44 is provided with an atmospheric opening 47.

A cap member 50 is mounted onto the cartridge body 41 in order to prevent leak of the inside ink that may be caused by a compressive deformation of the case 43 before loading when the ink supply port 45 is blocked at handling the inkjet cartridge for loading or transportation or when a pressure is applied to a wide sidewall during vacuum packing.

As shown in FIG. 2, the atmospheric opening 47 is sealed by sealing to the upper cover member 44 a film-shaped seal member 55 of which the oxygen permeability of 100 $ml/m^2$ or more. The seal member 55 has such a dimension as to seal the atmospheric opening 47 and a plurality of grooves 48 that are formed around the atmospheric opening 47. Sealing the atmospheric opening 47 with the seal member 55 having the oxygen permeability of 100 $ml/m^2$ or more may bring about an effect to enhance the degassing level of ink since even when an atmosphere present in a space A (see FIG. 3), which being formed between the ink absorbent 42 and the cartridge body 41, causes air to be dissolved in the ink, the air in the ink can be exhausted via the seal member 55 to a space between the cartridge body 41 and the pack member that is disposed outside the cartridge body 41 having a high degree of vacuum, by way of packing the cartridge 7 under a reduced pressure using a pack member made of an aluminum laminate film and the like that is free from air permeability.

Figure 4:
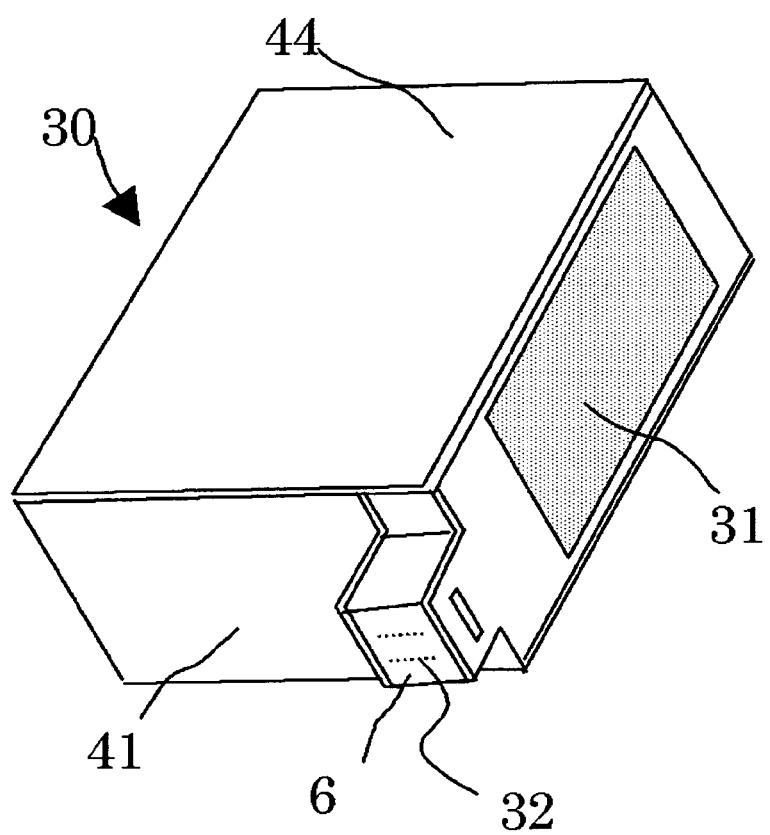
FIG. 4 is an outline perspective view that exemplarily shows a recording unit integrated with a recording head.

FIG. 4 shows a constitutional example of a record cartridge which is provided with an ink receiver, in which the ink composition of the inventive ink-media set being filled, and a head portion for ejecting the recording liquid. Specifically, the record unit 30 is of a serial type, and the main section is constructed from an inkjet head 6, an ink tank 41 for receiving therein the ink composition fed to the inkjet head 6, and a cover member for sealing the ink tank 41. The inkjet head 6 is provided with a number of nozzles 32 for ejecting the ink composition. The ink composition is directed to a common liquid chamber (not shown) through an ink supply tube (not shown) from an ink tank 41, and is ejected from the nozzle 32 in accordance with electric signals, from a recording apparatus body, inputted from an electrode 31. The recording unit of this type is referred to as so-called thermal or bubble type that can be produced at a lower cost by virtue of its inherent constitution, namely, a constitution suitable for the head that has its driving source of thermal energy.

The ink composition of the inventive ink-media set may exhibit ejection stability and frequency stability even in a small amount, and also superior safeness, thus is very suited since wetting ability to thermal elements is improved in the recording method in the thermal or bubble type.

In the above descriptions, the serial type inkjet recording apparatus is explained; the ink composition according to the present invention is also applicable to inkjet recording apparatuses having so-called a line head, in which nozzles are arranged arbitrarily in such a manner as zigzag where the nozzles are arranged as wide as or wider than the recording medium by integrating the density equal to or several fractions of the target image resolution.

The inkjet recording apparatuses are not limited to output printers for PC or digital cameras, but may be multifunctional apparatuses including a fax, scanner, telephone, and combination thereof.

Heater

The recording apparatus according to the present invention may be equipped with a heating fixing device to promote the fixing of the ink composition. The heating fixing device will be explained as regards the construction where a plurality of line-type inkjet heads is disposed and mounted onto a recording device.

Figure 5:
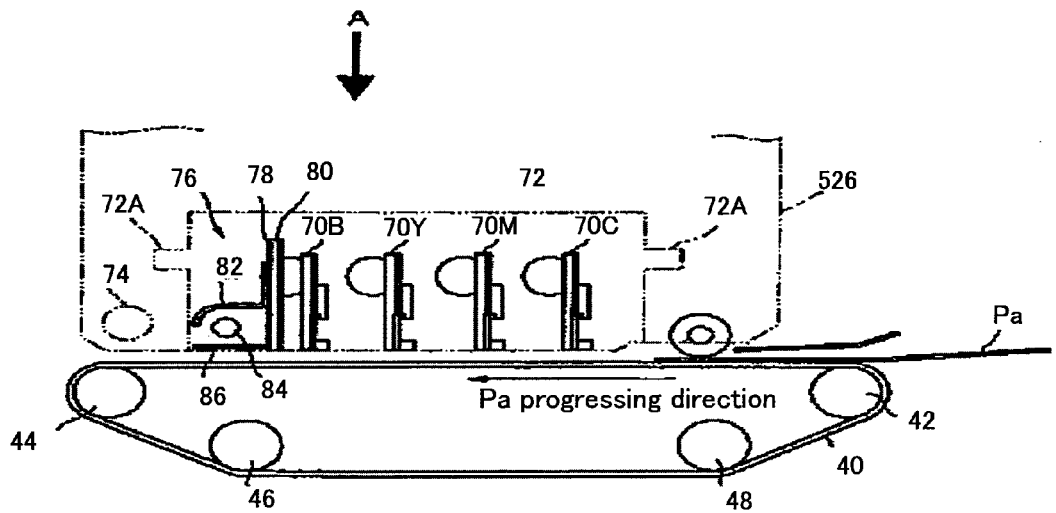
FIG. 5 is an outline front view of a heating and fixing device.
Figure 6:
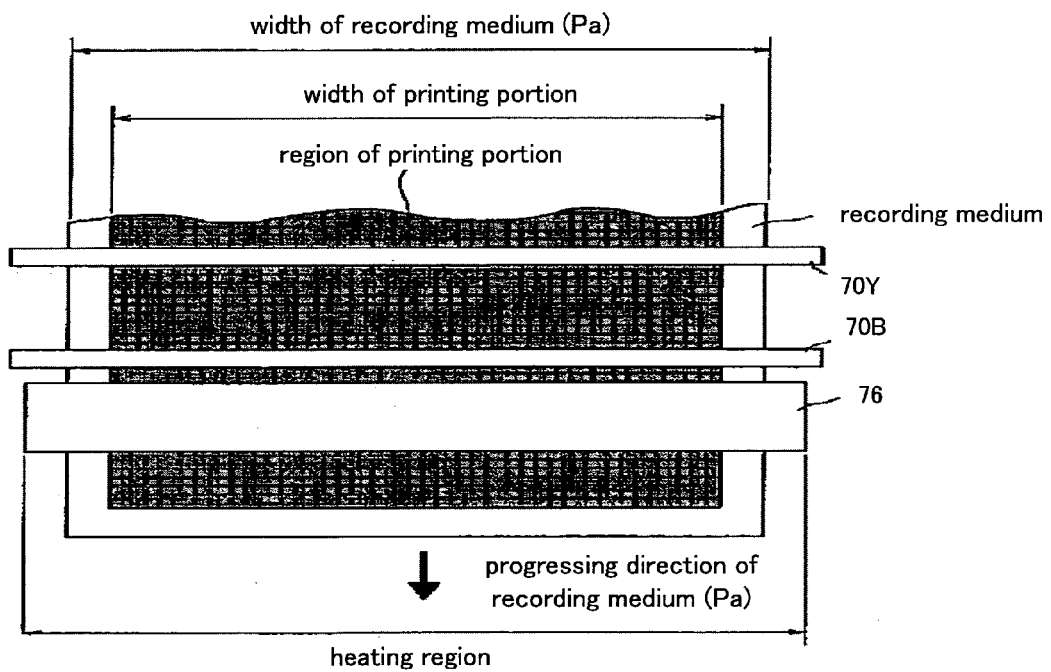
FIG. 6 is an illustrative view to explain a relation between a heating unit and a printing portion.

In FIG. 5, the spur 74 is a component in which several metal members of thin gear-like shape are attached to one shaft with a space therebetween, and rotates in a direction to discharge recording media coincidentally with a conveying belt 40. The spur 74 acts to guide recording media on printing and conveying such that the leading edge thereof does not interfere with members like a printer cover and the recording media are discharged smoothly and also to push surely the rear edge of the recording media on printing and conveying discharge by use of the driving force of the spur 74 to discharge them. The existence of the spur 74 may prevent troubles such as paper jamming and erroneous travel, meanwhile spur stain may occur when drying of inks is slow since the spur 74 contacts with and rolls on printing surface of recording media.

The heating fixing device 76 is provided on the downstream side of and relatively approximate to the recording head 70B along the conveyance path, as shown in FIG. 5. In this embodiment, a halogen heater 84 and a reflective plate 82 made to reflect heat radiation of the halogen heater 84 act as the heating-type ink fixing device 76, for example. Thus, according to the embodiment of the present invention, non-contacting heating of the printing surface of a recording medium (paper Pa) is achieved. That is, since the heating is carried out from the top of the surface of the printing area, volatile ingredients in inks such as water can be dried out efficiently. As the heating-type ink fixing device 76, there are provided the halogen heater 84 as the heating part, the reflective plate 82 reflecting the heat radiation from the halogen heater 84, a heating part separating member 86 separating the halogen heater 84 from the conveyance path, and a heat insulating device 78 thermally isolating the recording head 70B from the halogen heater 84 so as to avoid the heat of the heater 84 from reaching the recording head 70B.

Ink Recorded Matter

The inventive ink recorded matters are those recorded by the inventive inkjet recording apparatuses or the inventive inkjet recording methods.

The inventive ink recorded matters have an image formed by use of the ink composition of the ink-media set on the recording medium of the inventive ink-media set.

The recording medium may be properly selected depending on the application and may be similar as the recording media described above. These may be used alone or in combination of two or more.

The inventive ink recorded matter is formed from the ink composition that comprises a polymer fine particle containing a dye and an inorganic pigment particle, a water-soluble solvent, and water, and has a surface tension of 20 mN/m to 35 mN/m at 25° C., and the recording medium comprises a support and a coating layer on at least one side of the support, and the amount of pure water transferred to the recording medium is no less than 2 ml/m$^2$ and less than 35 ml/m$^2$ at a contact period of 100 ms and the amount of pure water transferred to the recording medium is no less than 3 ml/m$^2$ and less than 40 ml/m$^2$ at a contact period of 400 ms by measurement of a dynamic scanning absorptometer, therefore, high quality images with higher color saturation and adequate color tone can be obtained even on recording media with low ink absorbability. In addition, there exists an effect to increase color lightness (brightness) or color saturation (freshness) in color printing.

The inventive ink recorded matter can be favorably used in various applications as literatures or written materials on which various printing or images are recorded.

EXAMPLES

The present invention will be explained with reference to Examples, but to which the present invention should not be limited at all.

Preparation of Polymer

Three species of polymers were prepared as follows.

Polymer 1:

styrene acrylic polymer (product name: Johncryl 586, by Johnson Polymer Co. mass average molecular mass: 4,600, glass transition temperature Tg: 60° C.)

Polymer 2

The raw material of the ingredients shown below was filled into a four-necked 2 L flask, equipped with a water outlet, a thermometer, a nitrogen gas inlet, and a stirrer, and the mixture was heated to 180° C. over 3 hours while dewatering to cause dehydration condensation reaction thereby to synthesize a polyester resin.

| Ingredients | |
|---|---|
| Cardura E-10P*[1)] | 10 parts by mass |
| adipic acid | 27 parts by mass |

| Ingredients | |
|---|---|
| hexahydrophthalic anhydride | 42 parts by mass |
| neopentyl glycol | 2 parts by mass |
| trimethylolpropane | 26 parts by mass |
| dibutyltin dioxide | 0.1 part by mass |

[1] substance name: epoxydecanoate, by Japan Epoxy Resin Co Polymer 3

The raw material of the ingredients shown below was filled into a four-necked flask, equipped with a thermometer, a nitrogen gas inlet, a stirrer, and a reflux condenser, and the mixture was heated to react at 80° C. for 3 hours, followed by adding 0.01 part by mass of dibutyltin dilaurate to further react at the same temperature for 5 hours. After allowing the reactant to cool, 1 part by mass of ethylenediamine was added and the mixture was allowed to react for 1 hour thereby to synthesize a polyurethane resin.

| Ingredients | |
|---|---|
| methylethylketone | 90 parts by mass |
| 2,2-dimethylol propionic acid | 13 parts by mass |
| polylactone diol | 52 parts by mass |
| isophorone diisocyanate | 35 parts by mass |

Preparation of Mill Base
Ingredients of Mill Base (C-1)

| | |
|---|---|
| Solvent Blue 44[1] | 15 parts by mass |
| silica fine particle[2] | 5 parts by mass |
| Polymer 1 | 15 parts by mass |
| deionized water | 65 parts by mass |

[1] oil-soluble cyan dye, by Clariant Japan Co., Savinyl Cyan GLS
[2] by Japan Aerosil Co., Aerosil-RX200

2-Amino-2-methyl-1,3-propanediol was added to Polymer 1 and the mixture was dissolved into water, then the oil-soluble dye Solvent blue 44 and the silica fine particle described above were added to the solution and wetted well, and the dispersion was poured into a kneading device (Dyno-mill KDL A type, by WAB Co), to which zirconia beads of diameter 0.5 mm being filled, and was kneaded at 2,000 rpm for 40 minutes. Three parts by mass of 1 N HCl was added and stirred with the resulting mill base, to which 400 parts by mass of deionized water was added and stirred well, then the mixture was separated into a pigment paste and water using a centrifuge separator, and the supernatant was removed. After repeating the procedures several times, 1.0 part by mass of 2-amino-2-methyl-1,3-propanediol as a basic compound was added to the paste, and the mixture was kneaded again using the Dyno-mill KDL A type. The kneaded product was collected and filtered using a filter having a pore size of 1 μm thereby to produce a mill base C-1 having a dye concentration of 15% by mass.

| Ingredients of Mill Base (C-2) | |
|---|---|
| Solvent Blue 70[1] | 15 parts by mass |
| alumina fine particle[2] | 3 parts by mass |
| Polymer 1 | 15 parts by mass |
| deionized water | 67 parts by mass |

[1] oil-soluble cyan dye, by Taoka Chemical Co., Oleosol Fast Blue ELN
[2] by Sumitomo Chemical Co., APK-G008

A mill base C-2 having a dye concentration of 15% by mass was produced from the ingredients described above in the same manner as the mill base C-1.

Ingredients of Mill Base (C-3)

A mill base C-3 having a dye concentration of 15% by mass was produced in the same manner as the mill base C-2 except that the alumina fine particle was changed into titanium dioxide fine particle (by Ishihara Sangyo Kaisha Ltd., PT-401M).

| Ingredients of Mill Base (C-4) | |
|---|---|
| pigment blue 15:3[1] | 15 parts by mass |
| dispersant[2] | 5 parts by mass |
| deionized water | 80 parts by mass |

[1] organic pigment, by Dainichiseika Color & Chemicals Mfg. Co., ECB-301
[2] expressed by the following formula: $C_{12}H_{25}-O-(CH_2CH_2O)_{42}-H$ A mill base C-4 having a dye concentration of 15% by mass was produced from the ingredients described above in the same manner as the mill base C-1.

| Ingredients of Mill Base (K-1) | |
|---|---|
| Solvent Black 3[1] | 15 parts by mass |
| dispersant[2] | 5 parts by mass |
| deionized water | 80 parts by mass |

[1] by Orient Chemical Industries, Ltd., oil-soluble dye, Oil Black 860
[2] expressed by the following formula: $C_{12}H_{25}-O-(CH_2CH_2O)_{42}-H$ A mill base K-1 having a dye concentration of 15% by mass was produced from the ingredients described above in the same manner as the mill base C-1.

| Ingredients of Mill Base (Y-1) | |
|---|---|
| Disperse yellow 160[1] | 15 parts by mass |
| Polymer 2 | 15 parts by mass |
| deionized water | 70 parts by mass |

[1] by Arimoto Chemical Co., disperse dye, Plast Yellow 8050

2-Amino-2-methyl-1,3-propanediol was added to Polymer 2 and the mixture was dissolved into water, then the oil-soluble dye Solvent Red 49 described above was added to the solution and wetted well, and the dispersion was poured into a kneading device (Dyno-mill KDL A type, is by WAB Co.), to which zirconia beads of diameter 0.5 mm being filled, and was kneaded at 2,000 rpm for 60 minutes. Three parts by mass of 1 N HCl was added and stirred with the resulting mill base, to which 400 parts by mass of deionized water was added and stirred well, then the mixture was separated into a pigment paste and water using a centrifuge separator and the supernatant was removed. After repeating the procedures several times, 1.0 part by mass of 2-amino-2-methyl-1,3-propanediol as a basic compound was added to the paste, and the mixture was kneaded again using the Dyno-mill KDL A type. The kneaded product was collected and filtered using a filter having a pore size of 1 μm thereby to produce a mill base Y-1 having a dye concentration of 15% by mass.

| Ingredients of Mill Base (Y-2) | |
|---|---|
| Disperse yellow 160[1] | 15 parts by mass |
| alumina fine particle[2] | 3 parts by mass |

-continued

| Ingredients of Mill Base (Y-2) | |
|---|---|
| Polymer 2 | 15 parts by mass |
| deionized water | 67 parts by mass |

[1])by Arimoto Chemical Co., yellow disperse dye, PlastYellow 8050
[2])by Sumitomo Chemical Co., APK-G008

A mill base Y-2 having a dye concentration of 15% by mass was produced from the ingredients of the mill base Y-2 described above in a similar manner as the mill base C-1.

| Ingredients of Mill Base (M-2) | |
|---|---|
| Solvent Red 218*[1]) | 16 parts by mass |
| silica fine particle*[2]) | 8 parts by mass |
| Polymer 2 | 16 parts by mass |
| deionized water | 60 parts by mass |

[1])oil-soluble magenta dye, by Taoka Chemical Co., Oleosol Fast Pink FB
[2])by Japan Aerosil Co., Aerosil-RX200

A mill base M-2 having a dye concentration of 15% by mass was produced from the ingredients of the mill base M-2 described above in a similar manner as the mill base C-1.

| Ingredients of Mill Base (M-3) | |
|---|---|
| Solvent Red 218*[1]) | 16 parts by mass |
| titanium dioxide fine particle*[2]) | 4 parts by mass |
| Polymer 3 | 16 parts by mass |
| deionized water | 64 parts by mass |

[1])by Taoka Chemical Co., oil-soluble magenta dye, Oleosol Fast Pink FB
[2])by Ishihara Sangyo Kaisha Ltd., PT-401M A mill base M-3 having a dye concentration of 15% by mass was produced from the ingredients of the mill base M-3 described above in a similar manner as the mill base C-1.

The volume average particle diameter was measured as regards the polymer particles containing the resulting dyes and inorganic pigment particles produced in the mill bases; the results are shown in

TABLE 1

The measurements were carried out by use of UPA 150 (by Microtrac Co.).
Ingredients of Mill Base (M-7)

| Solvent Red 218*[1]) | 15 parts by mass |
|---|---|
| dispersant*[2]) | 5 parts by mass |
| deionized water | 80 parts by mass |

[1])by Taoka Chemical Co., oil-soluble dye, Oleosol Fast Pink FB
[2])expressed by the following formula:

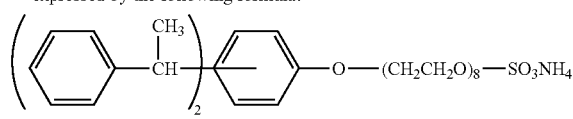

On the basis of the ingredients of the mill base described above, the dispersant was dissolved into deionized water, to which then the oil-soluble dye was added and wetted well, then the mixture was kneaded within a kneading device (Dyno-mill KDL A type, by WAB Co.), to which zirconia beads of diameter 0.5 mm being filled, and was kneaded at 2,000 rpm for 60 minutes, followed by collecting and filtering the kneaded material using a filter having a pore size of 1 μm thereby to produce a mill base M-7 having a dye concentration of 15% by mass.

Ingredients of Mill Base (M-8)

A mill base M-8 having a dye concentration of 15% by mass was produced in the same manner as the mill base M-7 except that the dispersant was changed into one having the structural formula below.

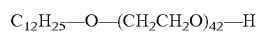

| Ingredients of Mill Base (M-9) | |
|---|---|
| Solvent Red 49*[1]) | 15 parts by mass |
| silica fine particle*[2]) | 5 parts by mass |
| Polymer 3 | 15 parts by mass |
| deionized water | 65 parts by mass |

[1])by Orient Chemical Industries, Ltd., oil-soluble dye, Oil Pink 312
[2])by Japan Aerosil Co., Aerosil-RX200

2-Amino-2-methyl-1,3-propanediol was added to Polymer 3 and the mixture was dissolved into water, then the oil-soluble dye of Solvent Red 49 and the silica fine particle described above were added to the solution and wetted well, then a mill base M-9 having a dye concentration of 15% by mass was produced in a similar manner as the mill base Y-1.

TABLE 1

| mill base | dye | inorganic pigment particle | polymer | volume average particle diameter (nm) |
|---|---|---|---|---|
| C-1 | Solvent Blue 44 | silica | styrene-acryl (Polymer 1) | 61 |
| Y-2 | Disperse Yellow 160 | alumina | polyester (Polymer 2) | 98 |
| M-2 | Solvent Red 218 | silica | polyester (Polymer 2) | 155 |
| M-3 | Solvent Red 218 | titanium dioxide | polyurethane (Polymer 3) | 124 |
| M-6 | Solvent Red 218 | titanium dioxide | polyurethane (Polymer 3) | 235 |

Preparation of Ink Composition 1

| Ingredients of Ink Composition 1 | |
|---|---|
| mill base C-1 | 40 parts by mass |
| glycerin | 6 parts by mass |
| 1,3-butanediol | 18 parts by mass |
| surfactant*[1]) | 2 parts by mass |
| 3-methyl-2,4-heptanediol | 2 parts by mass |
| Proxel LV*[2]) | 0.1 part by mass |
| deionized water | 31.9 parts by mass |

[1])expressed by the following formula: $C_{13}H_{27}-O-(CH_2CH_2O)_3-CH_2COONa$
[2])by Avecia Co., antiseptic/antifungal agent Glycerin, 1,3-butanediol, 3-methyl-2,4-heptanediol, the surfactant expressed by the formula described above, and Proxel LV were dissolved into deionized water to prepare a vehicle, the vehicle was mixed with the mill base (C-1), and then the mixture was filtered using a filter having an average pore size of 1 μm thereby to produce a cyan ink (Ink Composition 1) for inkjet recording.

Preparation of Ink Composition 2

| Ingredients of Ink Composition 2 | |
|---|---|
| mill base M-2 | 50 parts by mass |
| glycerin | 9 parts by mass |
| N-methyl-2-pyrrolidone | 18 parts by mass |
| FT-110*[1] | 1 part by mass |
| 3-methyl-2,4-heptanediol | 2 parts by mass |
| Proxel LV*[2] | 0.1 part by mass |
| deionized water | 19.9 parts by mass |

*[1] by Neos Company Ltd., fluorine-containing surfactant
*[2] by Avecia Co., antiseptic/antifungal agent A magenta ink (Ink Composition 2) for inkjet recording was prepared from the ink ingredients described above in a similar manner as the Ink Composition 1 described above.

Preparation of Ink Composition 3

| Ingredients of Ink Composition 3 | |
|---|---|
| mill base Y-2 | 50 parts by mass |
| glycerin | 9 parts by mass |
| 1,3-butanediol | 18 parts by mass |
| surfactant*[1] | 2 parts by mass |
| 2,2,4-trimethyl-1,3-pentanediol | 2 parts by mass |
| Proxel LV*[2] | 0.1 part by mass |
| deionized water | 18.9 parts by mass |

*[1] expressed by the following formula: $C_{13}H_{27}-O-(CH_2CH_2O)_8H$
*[2] by Avecia Co., antiseptic/antifungal agent A yellow ink (Ink Composition 3) for inkjet recording was prepared from the ink ingredients described above in a similar manner as the Ink Composition 1 described above.

Preparation of Ink Composition 4

| Ingredients of Ink Composition 4 | |
|---|---|
| mill base M-3 | 50 parts by mass |
| glycerin | 9 parts by mass |
| 1,3-butanediol | 18 parts by mass |
| surfactant*[1] | 2 parts by mass |
| 2,2,4-trimethyl-1,3-pentanediol | 2 parts by mass |
| Proxel LV*[2] | 0.1 part by mass |
| deionized water | 18.9 parts by mass |

*[1] expressed by the following formula $C_{13}H_{27}-O-(CH_2CH_2O)_8H$
*[2] by Avecia Co., antiseptic/antifungal agent A magenta ink (Ink Composition 4) for inkjet recording was prepared from the ink ingredients described above in a similar manner as the Ink Composition 1 described above.

Preparation of Ink Composition 5

| Ingredients of Ink Composition 5 | |
|---|---|
| mill base C-1 | 50 parts by mass |
| glycerin | 9 parts by mass |
| 3-methyl-1,3-butanediol | 18 parts by mass |
| FT-110*[1] | 1 part by mass |
| 3-methyl-2,4-heptanediol | 2 parts by mass |
| Proxel LV*[2] | 0.1 part by mass |
| deionized water | 19.9 parts by mass |

*[1] by Neos Company Ltd., fluorine-containing surfactant
*[2] by Avecia Co., antiseptic/antifungal agent A cyan ink (Ink Composition 5) for inkjet recording was prepared from the ink ingredients described above in a similar manner as the Ink Composition 1 described above.

Preparation of Ink Composition 6

| Ingredients of Ink Composition 6 | |
|---|---|
| mill base C-1 | 50 parts by mass |
| glycerin | 9 parts by mass |
| 1,6-hexanediol | 18 parts by mass |
| Proxel LV*[1] | 0.1 part by mass |
| deionized water | 22.9 parts by mass |

*[1] by Avecia Co., antiseptic/antifungal agent

A cyan ink (Ink Composition 6) for inkjet recording was prepared from the ink ingredients described above in a similar manner as the Ink Composition 1 described above.

Preparation of Ink Composition 7

| Ingredients of Ink Composition 7 | |
|---|---|
| Direct Blue 199*[1] | 9 parts by mass |
| glycerin | 9 parts by mass |
| 3-methyl-1,3-butanediol | 18 parts by mass |
| FT-110*[2] | 1 part by mass |
| 3-methyl-2,4-heptanediol | 2 parts by mass |
| Proxel LV*[3] | 0.1 part by mass |
| deionized water | 60.9 parts by mass |

*[1] by Ciba Specialty Chemicals Inc., cyan dye, Irgasperse Jet Cyan RL
*[2] by Neos Company Ltd., fluorine-containing surfactant
*[3] by Avecia Co., antiseptic/antifungal agent A direct dye of Direct Blue 199, glycerin, 3-methyl-1,3-butanediol, 3-methyl-2,4-heptanediol, FT-110, and Proxel LV were dissolved into deionized water, and then the solution was filtered using a filter having an average pore size of 0.5 μm thereby to produce a cyan ink (Ink Composition 7) for inkjet recording.

| Ingredients of Mill Base (M-4) | |
|---|---|
| Solvent Red 218*[1] | 14 parts by mass |
| dispersant*[2] | 4 parts by mass |
| deionized water | 82 parts by mass |

*[1] by Taoka Chemical Co., oil-soluble magenta dye, Oleosol Fast Pink FB
*[2] expressed by the following formula:

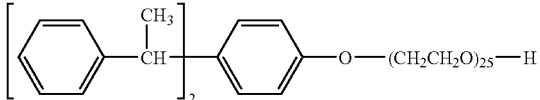

The dispersant was dissolved into deionized water, then the oil-soluble dye was mixed to the solution and wetted well, and the dispersion was poured into a kneading device (Dyno-mill KDL A type, by WAB Co.), to which zirconia beads of diameter 0.5 mm being filled, and was kneaded at 2,000 rpm for 2 hours to produce a mill base (M-4).

Preparation of Ink Composition 8

| Ingredients of Ink Composition 8 | |
|---|---|
| mill base M-4 | 50 parts by mass |
| glycerin | 9 parts by mass |
| 1,3-butanediol | 18 parts by mass |
| surfactant*[1] | 2 parts by mass |
| 2,2,4-trimethyl-1,3-pentanediol | 2 parts by mass |
| Proxel LV*[2] | 0.1 part by mass |
| deionized water | 18.9 parts by mass |

*[1] expressed by the following formula: $C_{13}H_{27}\text{—}O\text{—}(CH_2CH_2O)_8H$
*[2] by Avecia Co., antiseptic/antifungal agent A magenta ink (Ink Composition 8) for inkjet recording was prepared from the ink ingredients described above in a similar manner as the Ink Composition 1 described above.

| Ingredients of Mill Base (M-5) | |
|---|---|
| Pigment Violet 19*[1] | 14 parts by mass |
| dispersant | 4 parts by mass |
| deionized water | 82 parts by mass |

*[1] by Ciba Specialty Chemicals Inc., magenta pigment, CROMOPHTAL Red 2020
*[2] expressed by the following formula:

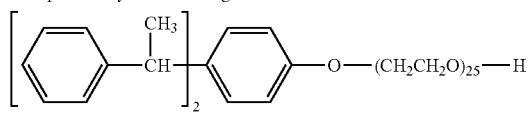

A mill base M-5 was produced from the ingredients of the mill base M-5 described above in a similar manner as the mill base C-1.

Preparation of Ink Composition 9

| Ingredients of Ink Composition 9 | |
|---|---|
| mill base M-5 | 50 parts by mass |
| glycerin | 9 parts by mass |
| 1,3-butanediol | 18 parts by mass |
| surfactant*[1] | 2 parts by mass |
| 2,2,4-trimethyl-1,3-pentanediol | 2 parts by mass |
| Proxel LV*[2] | 0.1 part by mass |
| deionized water | 18.9 parts by mass |

*[1] expressed by the following formula: $C_{13}H_{27}\text{—}O\text{—}(CH_2CH_2O)_8H$
*[2] by Avecia Co., antiseptic/antifungal agent A magenta ink (Ink Composition 9) for inkjet recording was prepared from the ink ingredients described above in a similar manner as the Ink Composition 1 described above.

Preparation of Ink Composition 10

Ingredients of Ink Composition 10

A magenta ink (Ink Composition 10) for inkjet recording was prepared in the same manner as the Ink Composition 4 except that the amount of glycerin was increased from 9 parts by mass to 13 parts by mass and the amount of 1,3-butanediol was increased from 18 parts by mass to 26 parts by mass, and the amount of deionized water was decreased from 18.9 parts by mass to 6.9 parts by mass.

| | |
|---|---|
| mill base M-3 | 50 parts by mass |
| glycerin | 13 parts by mass |
| 1,3-butanediol | 26 parts by mass |
| surfactant*[1] | 2 parts by mass |
| 2,2,4-trimethyl-1,3-pentanediol | 2 parts by mass |
| Proxel LV*[2] | 0.1 part by mass |
| deionized water | 6.9 parts by mass |

*[1] expressed by the following formula: $C_{13}H_{27}\text{—}O\text{—}(CH_2CH_2O)_8H$
*[2] by Avecia Co., antiseptic/antifungal agent

Preparation of Ink Composition 11

| Ingredients of Ink Composition 11 Ingredients of Mill Base (M-6) | |
|---|---|
| Solvent Red 218*[1] | 16 parts by mass |
| titanium dioxide fine particle*[2] | 4 parts by mass |
| Polymer 3 | 16 parts by mass |
| deionized water | 64 parts by mass |

*[1] by Taoka Chemical Co., oil-soluble magenta dye, Oleosol Fast Pink FB
*[2] by Ishihara Sangyo Kaisha Ltd., PT-401M A mill base (M-6) having a dye concentration of 15% by mass was produced from the ingredients of mill base (M-6) in a similar manner as the mill base (C-1) except that the treating period in the kneading device was changed into 20 minutes.

The volume average particle diameter was measured as regards the polymer particles containing the resulting dyes and inorganic pigment particles produced in the mill bases; the results are shown in Table 1. The measurements were carried out by use of UPA 150 (by Microtrac Co.).

A magenta ink (Ink Composition 11) for inkjet recording was prepared in a similar manner as the Ink Composition 4 described above except that the mill base of the Ink Composition 4 was changed into the mill base (M-6).

Preparation of Ink Composition 12

Ingredients of Ink Composition 12

An Ink Composition 12 was prepared in a similar manner as Ink Composition 5 except that 3-methyl-1,3-butanediol was changed into 1,6-hexanediol.

| Preparation of Ink Composition 13 | |
|---|---|
| mill base (M-7) | 40 parts by mass |
| glycerin | 12 parts by mass |
| 1,5-pentanediol | 12 parts by mass |
| 3-methyl-2,4-heptanediol | 2 parts by mass |
| Softanol 7025*[1] | 1 part by mass |
| Proxel LV*[2] | 0.1 part by mass |
| deionized water | 32.9 parts by mass |

*[1] surfactant, by Nippon Shokubai Co.
*[2] by Avecia Co., antiseptic/antifungal agent The ingredients described above, other than the mill base (M-7), were dissolved into deionized water to prepare a vehicle, the vehicle was mixed sufficiently with the mill base (M-7), and then the mixture was filtered using a filter having an average pore size of 1 μm thereby to produce a magenta ink for inkjet recording.

| Preparation of Ink Composition 14 | |
|---|---|
| mill base (M-8) | 40 parts by mass |
| glycerin | 24 parts by mass |
| Softanol 7025*[1] | 1 part by mass |

-continued

| Preparation of Ink Composition 14 | |
|---|---|
| Proxel LV*[2] | 0.1 part by mass |
| deionized water | 34.9 parts by mass |

*[1]surfactant, by Nippon Shokubai Co.
*[2]by Avecia Co., antiseptic/antifungal agent A magenta ink for inkjet recording was prepared from the ink ingredients described above in a similar manner as the Ink Composition 13 described above.

| Preparation of Ink Composition 15 | |
|---|---|
| mill base (M-8) | 40 parts by mass |
| glycerin | 6 parts by mass |
| dipropylene glycol | 18 parts by mass |
| 3-methyl-2,4-heptanediol | 2 parts by mass |
| Proxel LV*[1] | 0.1 part by mass |
| deionized water | 33.9 parts by mass |

*[1]by Avecia Co., antiseptic/antifungal agent

A magenta ink for inkjet recording was prepared from the ink ingredients described above in a similar manner as the Ink Composition 13 described above.

| Preparation of Ink Composition 16 | |
|---|---|
| mill base (K-1) | 40 parts by mass |
| glycerin | 6 parts by mass |
| triethylene glycol | 18 parts by mass |
| 3-methyl-2,4-heptanediol | 2 parts by mass |
| FT-110*[1] | 1 part by mass |
| Proxel LV*[2] | 0.1 part by mass |
| deionized water | 32.9 parts by mass |

*[1]by Neos Company Ltd., fluorine-containing surfactant
*[2]by Avecia Co., antiseptic/antifungal agent A black ink for inkjet recording was prepared from the ink ingredients described above in a similar manner as the Ink Composition 13 described above.

| Preparation of Ink Composition 17 | |
|---|---|
| mill base (Y-1) | 40 parts by mass |
| glycerin | 6 parts by mass |
| 1,6-hexanediol | 18 parts by mass |
| 2,2,4-trimethyl-1,3-pentanediol | 2 parts by mass |
| Softanol 7025*[1] | 1 part by mass |
| Proxel LV*[2] | 0.1 part by mass |
| deionized water | 32.9 parts by mass |

*[1]surfactant, by Nippon Shokubai Co.
*[2]by Avecia Co., antiseptic/antifungal agent A yellow ink for inkjet recording was prepared from the ink ingredients described above in a similar manner as the Ink Composition 13 described above.

| Preparation of Ink Composition 18 | |
|---|---|
| mill base (Y-1) | 40 parts by mass |
| glycerin | 6 parts by mass |
| 1,3-butanediol | 18 parts by mass |
| 3-methyl-2,4-heptanediol | 2 parts by mass |
| FT-110*[1] | 1 part by mass |

-continued

| Preparation of Ink Composition 18 | |
|---|---|
| 2-amino-2-methyl-1,3-propanediol | 0.2 part by mass |
| Proxel LV*[2] | 0.1 part by mass |
| deionized water | 32.7 parts by mass |

*[1]by Neos Company Ltd., fluorine-containing surfactant
*[2]by Avecia Co., antiseptic/antifungal agent A yellow ink for inkjet recording was prepared from the ink ingredients described above in a similar manner as the Ink Composition 13 described above.

| Preparation of Ink Composition 19 | |
|---|---|
| mill base (M-9) | 40 parts by mass |
| glycerin | 6 parts by mass |
| ethyleneglycol monobutylether | 18 parts by mass |
| 2,2,4-trimethyl-1,3-pentanediol | 2 parts by mass |
| FT-110*[1] | 1 part by mass |
| 2-amino-2-methyl-1,3-propanediol | 0.2 part by mass |
| Proxel LV*[2] | 0.1 part by mass |
| deionized water | 32.7 parts by mass |

*[1]by Neos Company Ltd., fluorine-containing surfactant
*[2]by Avecia Co., antiseptic/antifungal agent A magenta ink for inkjet recording was prepared from the ink ingredients described above in a similar manner as the Ink Composition 13 described above.

| Preparation of Ink Composition 20 | |
|---|---|
| mill base (M-9) | 40 parts by mass |
| glycerin | 6 parts by mass |
| propyleneglycol | 18 parts by mass |
| 3-methyl-2,4-heptanediol | 2 parts by mass |
| Surfinol 465*[1] | 1 part by mass |
| triethanol amine | 0.2 part by mass |
| Proxel LV*[2] | 0.1 part by mass |
| deionized water | 32.7 parts by mass |

*[1]by Nissin Chemical Industry Co., surfactant
*[2]by Avecia Co., antiseptic/antifungal agent A magenta ink for inkjet recording was prepared from the ink ingredients described above in a similar manner as the Ink Composition 13 described above.

| Preparation of Ink Composition 21 | |
|---|---|
| mill base (C-2) | 40 parts by mass |
| glycerin | 6 parts by mass |
| N-methyl-2-pyrrolidone | 18 parts by mass |
| 2,2,4-trimethyl-1,3-pentanediol | 2 parts by mass |
| Surfinol 465*[1] | 1 part by mass |
| lithium hydroxide | 0.2 part by mass |
| Proxel LV*[2] | 0.1 part by mass |
| deionized water | 32.7 parts by mass |

*[1]by Nissin Chemical Industry Co., surfactant
*[2]by Avecia Co., antiseptic/antifungal agent A cyan ink for inkjet recording was prepared from the ink ingredients described above in a similar manner as the Ink Composition 13 described above.

| Preparation of Ink Composition 22 | |
|---|---|
| mill base (C-3) | 40 parts by mass |
| glycerin | 6 parts by mass |
| 2-pyrrolidone | 18 parts by mass |
| 2,2,4-trimethyl-1,3-pentanediol | 2 parts by mass |
| Surfinol 465*[1] | 1 part by mass |
| triethanol amine | 0.2 part by mass |
| Proxel LV*[2] | 0.1 part by mass |
| deionized water | 32.7 parts by mass |

*[1] by Nissin Chemical Industry Co., surfactant
*[2] by Avecia Co., antiseptic/antifungal agent A cyan ink for inkjet recording was prepared from the ink ingredients described above in a similar manner as the Ink Composition 13 described above.

| Preparation of Ink Composition 23 | |
|---|---|
| mill base (C-3) | 40 parts by mass |
| glycerin | 6 parts by mass |
| 3-methyl-1,3-butanediol | 18 parts by mass |
| 3-methyl-2,4-heptanediol | 2 parts by mass |
| FT-110*[1] | 1 part by mass |
| 2-amino-2-methyl-1,3-propanediol | 0.2 part by mass |
| Proxel LV*[2] | 0.1 part by mass |
| deionized water | 32.7 parts by mass |

*[1] by Neos Company Ltd., fluorine-containing surfactant
*[2] by Avecia Co., antiseptic/antifungal agent A cyan ink for inkjet recording was prepared from the ink ingredients described above in a similar manner as the Ink Composition 13 described above.

| Preparation of Ink Composition 24 | |
|---|---|
| Direct Blue 199*[1] | 6 parts by mass |
| glycerin | 6 parts by mass |
| N-methyl-2-pyrrolidone | 18 parts by mass |
| 3-methyl-2,4-heptanediol | 2 parts by mass |
| Surfinol 465*[2] | 1 part by mass |
| 2-amino-2-methyl-1,3-propanediol | 0.2 part by mass |
| Proxel LV*[3] | 0.1 part by mass |
| deionized water | 66.7 parts by mass |

*[1] by Ciba Specialty Chemicals Inc., direct dye, Irgasperse Jet Cyan RL
*[2] by Nissin Chemical Industry Co., surfactant
*[3] by Avecia Co., antiseptic/antifungal agent The ingredients described above, other than the Direct Blue 199, were dissolved into deionized water to prepare a vehicle, the vehicle was mixed with the Direct Blue 199, and then the mixture was filtered using a filter having an average pore size of 0.5 μm thereby to produce a cyan ink for inkjet recording.

| Preparation of Ink Composition 25 | |
|---|---|
| mill base (M-7) | 40 parts by mass |
| 1,5-pentanediol | 24 parts by mass |
| 3-methyl-2,4-heptanediol | 2 parts by mass |
| Softanol 7025*[1] | 1 part by mass |
| Proxel LV*[2] | 0.1 part by mass |
| deionized water | 32.9 parts by mass |

*[1] surfactant, by Nippon Shokubai Co.
*[2] by Avecia Co., antiseptic/antifungal agent A magenta ink for inkjet recording was prepared in the same manner as Ink Composition 13, except that glycerin was removed from the ingredients of the Ink Composition 13 and 1,5-pentanediol was increased to 24 parts by mass.

| Preparation of Ink Composition 26 | |
|---|---|
| mill base (Y-1) | 40 parts by mass |
| 1,6-hexanediol | 24 parts by mass |
| 2,2,4-trimethyl-1,3-pentanediol | 2 parts by mass |
| Softanol 7025*[1] | 1 part by mass |
| Proxel LV*[2] | 0.1 part by mass |
| deionized water | 32.9 parts by mass |

*[1] surfactant, by Nippon Shokubai Co.
*[2] by Avecia Co., antiseptic/antifungal agent A yellow ink for inkjet recording was prepared in a similar manner as Ink Composition 13 from the ink ingredients of the Ink Composition 17 except that glycerin was removed therefrom and 1,6-hexanediol was increased to 24 parts by mass.

| Preparation of Ink Composition 27 | |
|---|---|
| mill base (C-4) | 40 parts by mass |
| glycerin | 6 parts by mass |
| 3-methyl-1,3-butanediol | 18 parts by mass |
| 3-methyl-2,4-heptanediol | 2 parts by mass |
| FT-110*[1] | 1 part by mass |
| 2-amino-2-methyl-1,3-propanediol | 0.2 part by mass |
| Proxel LV*[2] | 0.1 part by mass |
| deionized water | 32.7 parts by mass |

*[1] by Neos Company Ltd., fluorine-containing surfactant
*[2] by Avecia Co., antiseptic/antifungal agent A cyan ink for inkjet recording was prepared in a similar manner as Ink Composition 13 from the ink ingredients of the Ink Composition 23 except that the mill base (C-2) was changed into the mill base (C-4).

The resulting Ink Compositions 1 to 27 were measured in terms of volume average particle diameter, viscosity, surface tension, pH, and soluble content. The results are shown in Table 2.

(i) Volume Average Particle Diameter

The volume average particle diameter was measured using UPA-EX 150 (by Microtrac Co.) at 25° C. after diluting samples to be measured with deionized water to 500 times.

(ii) Viscosity

The viscosity was measured using RC-500 (by Toki Sangyo Co.) at 25° C.

(iii) Surface Tension

The surface tension was measured using Model CBVP-Z (by Kyowa Interface Science Co.,) at 25° C.

(iv) pH

The pH was measured using pH BOY-P2 (by Shindengen Electric Mfg. Co.) at 25° C.

(v) Soluble Content

The rate (%) of soluble color materials relative to color materials in inks can be determined by way of measuring an ink composition and a filtrate of the ink composition in terms of their spectroscopic absorption spectra using a spectrophotometer and comparing their absorbance at the peak wavelength. The filtering process is desirably ultrafiltration in order to separate between dispersion particles and soluble materials.

Biomax PXB050A50 (by Millipore Co.) with a molecular weight cut off of 50,000 (corresponding to a conversion particle diameter of 5 nm) was used as the ultrafiltration device. U-3310 (by Hitachi Co.) was used as the spectrophotometer to measure optical spectra in a wavelength range of 200 to 800 nm.

Specifically, the soluble content is measured and calculated as follows. Initially, absorption spectrum distribution is determined with respect to an ink as an original liquid. The concentration of inks is typically too large in their original liquids, thus the inks are diluted from 500 to 5,000 times using pure water (dilution ratio Ka is recorded) and the diluted ink is inserted into a measuring cell of the spectrophotometer. Pure water is filled into a reference cell, and the cell is scanned at a sampling interval of 5 nm or less at least in a visible light range of 340 to 800 nm to take a spectroscopic absorption spectrum of the original liquid shown by the mark ■ in FIG. 7. The original liquid of the ink is treated with ultrafiltration after measuring the spectroscopic absorption spectrum. The filtrate is diluted to a concentration measurable by the spectrophotometer, the dilution ratio Kb is recorded, the diluted filtrate is inserted into a measuring cell of the spectrophotometer and measured under the same condition with that of the original liquid of the ink, thereby to obtain a spectroscopic absorption spectrum of the filtrate shown by the mark Δ in FIG. 7. The values A, B of the absorbance (abs) are obtained at the absorption peak wavelengths of the original liquid and the filtrate, then the soluble content is calculated from the following equation. It is preferred that the maximum peak is selected in cases where two or more peaks exist for the absorbance (abs).

Soluble content(%)=$(Kb \times B)/(Ka \times A) \times 100$

Figure 7:
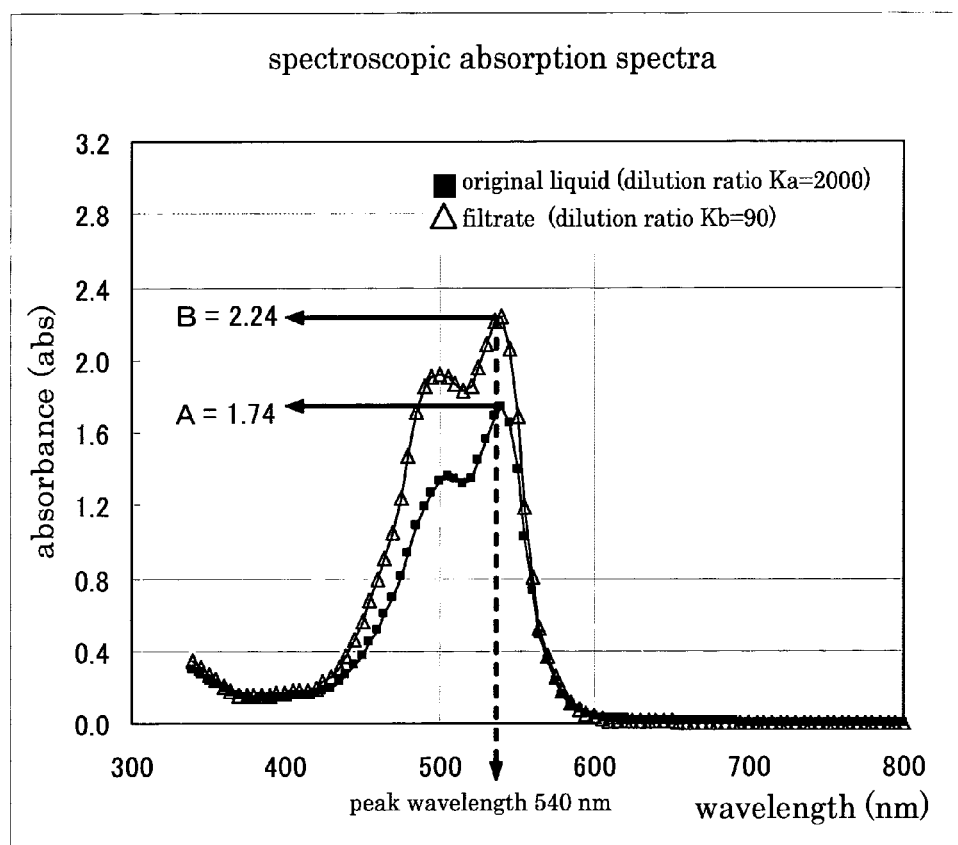
FIG. 7 is a view that shows spectroscopic absorption spectra to explain a method to measure and to calculate a soluble content.

The soluble content in FIG. 7 can be calculated as follows, for example.

Soluble content(%)=$(90 \times 2.24)/(2000 \times 1.74) \times 100 = 5.8\%$

TABLE 2

| | volume average particle diameter (nm) | viscosity (mPa·s) | surface tension (mN/m) | pH | soluble content (%) |
|---|---|---|---|---|---|
| ink 1 | 61 | 4.1 | 30.8 | 7.5 | 4.2 |
| ink 2 | 155 | 7.4 | 25.5 | 6.9 | 8.5 |
| ink 3 | 98 | 8.3 | 31.5 | 6.3 | 2.9 |
| ink 4 | 124 | 9.0 | 30.5 | 7.2 | 6.2 |
| ink 5 | 61 | 7.6 | 25.8 | 7.6 | 3.8 |
| ink 6 | 61 | 8.0 | 37.2 | 7.2 | 4.4 |
| ink 7 | no data | 6.2 | 26.3 | 7.6 | 99.5 |
| ink 8 | 188 | 9.0 | 30.9 | 6.6 | 12.2 |
| ink 9 | 100 | 7.0 | 31.1 | 7.9 | 0.0 |
| ink 10 | 124 | 52.1 | 31.9 | 7.2 | 7.7 |
| ink 11 | 235 | 6.2 | 30.7 | 7.0 | 3.4 |
| ink 12 | 61 | 8.8 | 24.9 | 7.4 | 8.0 |
| ink 13 | 170 | 5.4 | 32.3 | 7.8 | 9.0 |
| ink 14 | 145 | 6.1 | 34.0 | 7.3 | 6.5 |
| ink 15 | 121 | 10.2 | 36.0 | 7.5 | 1.5 |
| ink 16 | 55 | 7.3 | 26.1 | 6.5 | 2.8 |
| ink 17 | 96 | 13.4 | 30.3 | 6.8 | 2.7 |
| ink 18 | 99 | 32.0 | 24.9 | 8.3 | 1.6 |
| ink 19 | 130 | 4.5 | 25.4 | 7.6 | 7.2 |
| ink 20 | 125 | 6.5 | 25.8 | 7.9 | 5.6 |
| ink 21 | 106 | 9.1 | 25.9 | 8.4 | 1.5 |
| ink 22 | 85 | 8.6 | 26.0 | 8.8 | 1.7 |
| ink 23 | 92 | 7.5 | 24.5 | 9.0 | 0.8 |
| ink 24 | *) | 5.6 | 26.9 | 8.6 | 99.8 |
| ink 25 | 182 | 7.2 | 33.0 | 8.1 | 31.1 |
| ink 26 | 96 | 17.2 | 30.8 | 7.7 | 15.0 |
| ink 27 | 98 | 9.0 | 25.3 | 8.8 | 0.0 |

*) unmeasurable since 99.8% of colorant dissolves

The amount of transferred pure water was measured for the seven species of the following recording media used for evaluations. The results are shown in Table 3. The measurement was carried out using a dynamic scanning absorptometer (K350 series D type, Kyowaseiko Co.)

Recording Media recording medium A: aurora coat, basic weight=104.7 g/m² (Nippon Paper Industries Co.), basic material: pulp, coating layer: kaolin, calcium carbonate, starch, and binder resin (both sides), thickness: about 100 μm;

recording medium B: POD gloss coat 100 g/m² paper (by Oji Paper Co.);

recording medium C: Superfine exclusive paper (by Seiko Epson Co.);

recording medium C': Superfine paper (by Seiko Epson Co.), basic material: pulp, coating layer: silica, alumina, starch, and binder resin (one side), thickness: about 120 μm;

recording medium D: Lumirror U10 (by Toray Industries, Inc.);

recording medium D': Lumirror U12 (by Toray Industries, Inc.), base material: polyester (PET) film, coating layer: non, thickness: about 125 μm;

recording medium E: space DX mat paper, mat coat paper for inkjet (by Nippon Paper Industries Co.), basic material: pulp, coating layer: kaolin, calcium carbonate, starch, and binder resin (both sides), thickness: about 60 μm;

TABLE 3

| | transferred amount of pure water (ml/m²) | |
|---|---|---|
| species of paper | contact period 100 ms | contact period 400 ms |
| recording medium A | 2.8 | 3.4 |
| recording medium B | 3.1 | 3.5 |
| recording medium C | 41.0 | 44.8 |
| recording medium C' | 41.0 | 44.8 |
| recording medium D | 0.1 | 0.1 |
| recording medium D' | 0.1 | 0.1 |
| recording medium E | 10.2 | 22.5 |

The results of measuring the amount of transferred ink onto the five species of the recording media (ml/m²) are shown in Tables 4 to 5 below. The measurement was carried out using a dynamic scanning absorptometer (K350 series D type, Kyowaseiko Co.)

TABLE 4

| | transferred amount (ml/m²) at contact period 100 ms | | | | |
|---|---|---|---|---|---|
| | A | B | C/C' | D/D' | E |
| ink 1 | 2 | 5 | 22 | 0 | 7 |
| ink 2 | 3 | 4 | 17 | 0 | 6 |
| ink 3 | 2 | 5 | 23 | 0 | 7 |
| ink 4 | 2 | 5 | 21 | 0 | 8 |
| ink 5 | 3 | 4 | 18 | 0 | 8 |
| ink 6 | 2 | 6 | 25 | 0 | 9 |
| ink 7 | 3 | 4 | 18 | 0 | 7 |
| ink 8 | 2 | 5 | 20 | 0 | 8 |
| ink 9 | 2 | 5 | 22 | 0 | 7 |
| ink 10 | 3 | 6 | 25 | 0 | 9 |
| ink 11 | 2 | 5 | 23 | 0 | 7 |
| ink 12 | 3 | 4 | 19 | 0 | 7 |
| ink 13 | 2 | 6 | 20 | 0 | 8 |
| ink 14 | 2 | 5 | 23 | 0 | 8 |
| ink 15 | 2 | 6 | 26 | 0 | 9 |
| ink 16 | 3 | 4 | 17 | 0 | 7 |
| ink 17 | 2 | 6 | 20 | 0 | 8 |
| ink 18 | 3 | 4 | 17 | 0 | 6 |
| ink 19 | 3 | 4 | 18 | 0 | 6 |
| ink 20 | 3 | 4 | 16 | 0 | 5 |
| ink 21 | 3 | 4 | 18 | 0 | 6 |
| ink 22 | 3 | 4 | 16 | 0 | 6 |
| ink 23 | 3 | 4 | 16 | 0 | 6 |

TABLE 4-continued

| | transferred amount (ml/m²) at contact period 100 ms | | | | |
|---|---|---|---|---|---|
| | A | B | C/C' | D/D' | E |
| ink 24 | 3 | 4 | 17 | 0 | 7 |
| ink 25 | 2 | 5 | 20 | 0 | 9 |
| ink 26 | 2 | 5 | 23 | 0 | 8 |
| ink 27 | 3 | 4 | 17 | 0 | 7 |

TABLE 5

| | transferred amount (ml/m²) at contact period 400 ms | | | | |
|---|---|---|---|---|---|
| | A | B | C/C' | D/D' | E |
| ink 1 | 3 | 8 | 24 | 0 | 11 |
| ink 2 | 5 | 7 | 22 | 0 | 10 |
| ink 3 | 4 | 7 | 25 | 0 | 11 |
| ink 4 | 3 | 8 | 26 | 0 | 11 |
| ink 5 | 3 | 7 | 23 | 0 | 9 |
| ink 6 | 4 | 9 | 31 | 1 | 14 |
| ink 7 | 4 | 8 | 25 | 0 | 9 |
| ink 8 | 3 | 8 | 25 | 0 | 12 |
| ink 9 | 4 | 8 | 27 | 0 | 11 |
| ink 10 | 4 | 9 | 34 | 1 | 14 |
| ink 11 | 3 | 8 | 27 | 0 | 12 |
| ink 12 | 4 | 7 | 23 | 0 | 12 |
| ink 13 | 3 | 9 | 31 | 1 | 13 |
| ink 14 | 4 | 8 | 34 | 1 | 13 |
| ink 15 | 4 | 9 | 35 | 1 | 17 |
| ink 16 | 5 | 8 | 26 | 0 | 10 |
| ink 17 | 4 | 8 | 32 | 0 | 13 |
| ink 18 | 6 | 8 | 25 | 0 | 9 |
| ink 19 | 3 | 8 | 24 | 0 | 10 |
| ink 20 | 4 | 7 | 23 | 0 | 10 |
| ink 21 | 4 | 8 | 25 | 0 | 9 |
| ink 22 | 4 | 8 | 23 | 0 | 10 |
| ink 23 | 4 | 7 | 22 | 0 | 9 |
| ink 24 | 4 | 8 | 26 | 0 | 11 |
| ink 25 | 3 | 8 | 31 | 1 | 12 |
| ink 26 | 3 | 9 | 34 | 1 | 13 |
| ink 27 | 3 | 8 | 25 | 0 | 11 |

Ink recorded matters were produced from the resulting inks and the seven species of the recording media described above using Ipsio G7570 (by Ricoh Co.). The items for evaluating image quality and their evaluation results are shown in Tables 6 to 10.

(i) Spreading

Four point characters of printed image were visually evaluated in accordance with the following criteria.
 A: sharp, and no spreading of ink
 B: somewhat blurred, but allowable level
 C: spreading
 D: spreading such that characters being illegible (ii) Show Through (Strike Through)

The image density was measured from back side of a solid portion using a reflective/color spectrophotometric densitometer (by X-Rite Co.). The measured value was deducted by the measured value of image density of the recording medium itself to obtain the value of show through density, and evaluated in accordance with the following criteria. The allowable level is below 0.10 of the show through density.
 A: show through density (STD)<0.05
 B: $0.05 \leq STD<0.10$
 C: $0.10 \leq STD<0.20$
 D: $0.20 \leq STD$ (iii) Beading (Density Nonuniformity)

The level of density nonuniformity at solid portion was visually evaluated in accordance with the following criteria.
 A: entirely uniform, and density nonuniformity being nondetectable
 B: density nonuniformity being detectable, but allowable level
 C: density nonuniformity being detectable in non-allowable level
 D: density nonuniformity being significant (iv) Color Saturation The ratio of color saturation of a color image, measured by the reflective/color spectrophotometric densitometer (by X-Rite Co.), to those of standard color (yellow: 91.34, magenta: 74.55, cyan: 62.82, Japan color ver. 2) was calculated and evaluated in accordance with the following criteria. Allowable level is B or better.
 A: $1.0 \leq$ ratio
 B: $0.8 \leq$ ratio$<1.0$
 C: $0.7 \leq$ ratio$<0.8$
 D: ratio$<0.7$ (v) Spur Stain The level of offset smear due to spurs from solid portions to background portions was visually evaluated in accordance with the following criteria. Allowable level is 3 or better.
 rank 3: no offset smear
 rank 2: slight offset smear
 rank 1: apparent offset smear

TABLE 6

| | recording medium A | | | | |
|---|---|---|---|---|---|
| | Spreading | Show Through | Beading | Color Saturation | Spur Stain |
| ink 1 | B | A | B | A | 3 |
| ink 2 | B | B | A | A | 3 |
| ink 3 | B | A | A | A | 3 |
| ink 4 | B | B | A | A | 3 |
| ink 5 | B | A | A | A | 3 |
| ink 6 | C | A | D | B | 2 |
| ink 7 | D | D | D | D | 2 |
| ink 8 | D | C | C | C | 2 |
| ink 9 | B | A | D | B | 2 |
| ink 10 | B | B | B | B | 3 |
| ink 11 | B | A | B | B | 3 |
| ink 12 | B | B | A | A | 3 |
| ink 13 | C | B | C | B | 3 |
| ink 14 | C | B | B | B | 2 |
| ink 15 | B | A | C | B | 3 |
| ink 16 | B | A | A | — | 2 |
| ink 17 | B | A | A | A | 2 |
| ink 18 | B | A | B | A | 2 |
| ink 19 | C | B | B | B | 3 |
| ink 20 | C | A | A | A | 3 |
| ink 21 | B | A | A | A | 3 |
| ink 22 | B | A | A | A | 3 |
| ink 23 | B | A | B | A | 3 |
| ink 24 | D | D | B | D | 2 |
| ink 25 | D | C | B | B | 2 |
| ink 26 | D | B | B | A | 2 |
| ink 27 | B | A | C | B | 2 |

TABLE 7

| | recording medium B | | | | |
|---|---|---|---|---|---|
| | Spreading | Show Through | Beading | Color Saturation | Spur Stain |
| ink 1 | B | B | A | A | 3 |
| ink 2 | B | B | A | A | 3 |
| ink 3 | A | A | A | A | 3 |
| ink 4 | B | B | A | A | 3 |
| ink 5 | B | A | A | A | 3 |

TABLE 7-continued recording medium B

| | Spreading | Show Through | Beading | Color Saturation | Spur Stain |
|---|---|---|---|---|---|
| ink 6 | C | A | D | C | 2 |
| ink 7 | D | D | C | D | 2 |
| ink 8 | C | B | D | C | 2 |
| ink 9 | A | A | D | B | 2 |
| ink 10 | B | B | B | B | 3 |
| ink 11 | B | A | A | A | 3 |
| ink 12 | B | B | A | A | 3 |
| ink 13 | B | A | B | B | 2 |
| ink 14 | B | B | A | B | 2 |
| ink 15 | A | A | A | B | 2 |
| ink 16 | A | A | A | — | 2 |
| ink 17 | A | B | A | B | 2 |
| ink 18 | A | A | A | B | 2 |
| ink 19 | B | A | B | A | 3 |
| ink 20 | B | A | A | A | 3 |
| ink 21 | A | A | A | A | 3 |
| ink 22 | A | A | A | A | 3 |
| ink 23 | A | A | A | A | 3 |
| ink 24 | D | D | A | D | 2 |
| ink 25 | D | D | B | B | 2 |
| ink 26 | C | C | A | B | 2 |
| ink 27 | A | A | B | C | 2 |

TABLE 8 recording medium C/C'

| | Spreading | Show Through | Beading | Color Saturation | Spur Stain |
|---|---|---|---|---|---|
| ink 1 | C | A | A | A | 3 |
| ink 2 | C | A | A | A | 3 |
| ink 3 | C | A | A | A | 3 |
| ink 4 | C | A | A | A | 3 |
| ink 5 | C | A | A | A | 3 |
| ink 6 | C | A | B | B | 2 |
| ink 7 | C | A | B | A | 3 |
| ink 8 | C | A | A | A | 3 |
| ink 9 | C | A | A | B | 3 |
| ink 10 | C | A | B | B | 3 |
| ink 11 | C | A | A | B | 3 |
| ink 12 | C | A | A | A | 3 |
| ink 13 | A | A | A | A | 2 |
| ink 14 | A | A | A | B | 2 |
| ink 15 | A | A | A | C | 2 |
| ink 16 | A | A | A | — | 2 |
| ink 17 | A | A | A | A | 2 |
| ink 18 | A | A | A | C | 2 |
| ink 19 | B | A | A | A | 2 |
| ink 20 | A | A | A | A | 2 |
| ink 21 | A | A | A | A | 2 |
| ink 22 | A | A | A | A | 2 |
| ink 23 | A | A | A | A | 2 |
| ink 24 | B | A | A | B | 2 |
| ink 25 | C | A | A | A | 2 |
| ink 26 | C | A | A | A | 2 |
| ink 27 | C | A | A | B | 3 |

TABLE 9 recording medium D/D'

| | Spreading | Show Through | Beading | Color Saturation | Spur Stain |
|---|---|---|---|---|---|
| ink 1 | B | A | D | D | 1 |
| ink 2 | C | A | D | C | 1 |
| ink 3 | B | A | D | C | 1 |
| ink 4 | B | A | D | C | 1 |
| ink 5 | B | A | D | C | 1 |

TABLE 9-continued recording medium D/D'

| | Spreading | Show Through | Beading | Color Saturation | Spur Stain |
|---|---|---|---|---|---|
| ink 6 | D | A | D | D | 1 |
| ink 7 | D | A | D | D | 1 |
| ink 8 | D | A | D | D | 1 |
| ink 9 | B | A | D | C | 1 |
| ink 10 | C | A | D | B | 1 |
| ink 11 | B | A | D | B | 2 |
| ink 12 | C | A | D | A | 2 |
| ink 13 | A | A | D | C | 1 |
| ink 14 | A | A | D | D | 1 |
| ink 15 | A | A | D | C | 1 |
| ink 16 | A | A | D | — | 1 |
| ink 17 | A | A | D | C | 1 |
| ink 18 | A | A | D | C | 1 |
| ink 19 | A | A | D | C | 1 |
| ink 20 | A | A | D | C | 1 |
| ink 21 | A | A | D | C | 1 |
| ink 22 | A | A | D | C | 1 |
| ink 23 | A | A | D | C | 1 |
| ink 24 | D | A | D | D | 1 |
| ink 25 | D | A | D | C | 1 |
| ink 26 | D | A | D | C | 1 |
| ink 27 | C | A | D | D | 1 |

TABLE 10 recording medium E

| | Spreading | Show Through | Beading | Color Saturation | Spur Stain |
|---|---|---|---|---|---|
| ink 1 | B | A | A | A | 3 |
| ink 2 | B | B | A | A | 3 |
| ink 3 | B | A | A | A | 3 |
| ink 4 | B | A | A | A | 3 |
| ink 5 | B | A | A | A | 3 |
| ink 6 | C | A | D | B | 2 |
| ink 7 | D | C | A | C | 3 |
| ink 8 | C | C | C | B | 3 |
| ink 9 | A | A | D | B | 2 |
| ink 10 | B | B | A | B | 3 |
| ink 11 | B | A | A | A | 3 |
| ink 12 | B | B | A | A | 3 |
| ink 13 | B | B | B | B | 2 |
| ink 14 | B | A | A | B | 2 |
| ink 15 | A | A | B | B | 2 |
| ink 16 | A | A | A | — | 2 |
| ink 17 | A | A | A | B | 2 |
| ink 18 | A | A | A | A | 2 |
| ink 19 | B | A | A | A | 3 |
| ink 20 | B | A | A | A | 3 |
| ink 21 | A | A | A | A | 3 |
| ink 22 | A | A | A | A | 3 |
| ink 23 | A | A | A | A | 3 |
| ink 24 | D | D | A | D | 2 |
| ink 25 | D | C | B | B | 2 |
| ink 26 | C | B | A | A | 2 |
| ink 27 | A | A | A | C | 3 |

The recording media C', D' are equivalent with C, D and the evaluation results are the same.

INDUSTRIAL APPLICABILITY

The ink-media sets according to the present invention may provide highly fine high quality images by way of combining a recording medium having a certain liquid absorbability and an ink composition having a certain surface tension, thus can be favorably utilized for ink cartridges, ink recorded matters, ink-jet recording apparatuses, and ink-jet recording methods.

The ink-jet recording apparatuses and ink-jet recording methods according to the present invention may be applied to various recordings of ink-jet recording processes, and also favorably utilized for ink-jet recording printers, facsimiles, copiers, and printer/facsimile/copier complex apparatuses in particular.

The invention claimed is:

1. An ink-media set, comprising an ink composition and a recording medium,
   wherein the ink composition comprises a polymer fine particle containing a dye and an inorganic pigment particle, a water-soluble solvent, and water, and has a surface tension of 20 mN/m to 35 mN/m at 25° C., and
   the recording medium comprises a support and a coating layer on at least one side of the support, and the amount of pure water transferred to the recording medium is no less than 2 ml/m² and less than 35 ml/m² at a contact period of 100 ms and the amount of pure water transferred to the recording medium is no less than 3 ml/m² and less than 40 ml/m² at a contact period of 400 ms by measurement of a dynamic scanning absorptometer.

2. The ink-media set according to claim 1, wherein the viscosity of the ink composition is 5 mPa·s to 50 mPa·s at 25° C.

3. The ink-media set according to claim 1, wherein the dye is at least one of oil-soluble dyes and disperse dyes.

4. The ink-media set according to claim 1, wherein the inorganic pigment particle is one of titanium dioxide particles, alumina particles, and silica particles.

5. The ink-media set according to claim 1, wherein the polymer of the polymer fine particle containing the dye and the inorganic pigment particle is at least one of polyester resins, polyurethane resins, vinyl resins, and acrylic resins.

6. The ink-media set according to claim 1, wherein the volume average particle diameter of the polymer fine particle containing the dye and the inorganic pigment fine particle is 5 nm to 200 nm.

7. The ink-media set according to claim 1, wherein the water-soluble solvent is at least one of glycerin, dieihylene glycol, triethylene glycol, 1,3-butanediol, 1,6-hexanediol, propylene glycol, 1,5-pentanediol, dipropylene glycol, trimethylolpropane, and 3-methyl-1,3-butanediol.

8. The ink-media set according to claim 1, wherein the ink-media set comprises at least one of polyol compounds having 8 or more carbon atoms and glycol ether compounds.

9. The ink-media set according to claim 1, wherein
   the dye and the inorganic pigment exist in a partially dispersed condition and a partially dissolved condition in water and the water-soluble solvent, and the amount of the dye and the inorganic pigment in the dissolved condition after separating by way of ultrafiltration, of which molecular mass cut off being 50,000, is no more than 10% based on total amount of the dye and inorganic pigment particle in the ink composition.

* * * * *